(12) United States Patent
Haddad et al.

(10) Patent No.: US 12,543,003 B2
(45) Date of Patent: Feb. 3, 2026

(54) SPEAKERPHONE WITH BEAMFORMER-BASED CONFERENCE CHARACTERIZATION AND RELATED METHODS

(71) Applicant: GN Audio A/S, Ballerup (DK)

(72) Inventors: Karim Haddad, Ballerup (DK); Clément Laroche, Ballerup (DK); Rasmus Kongsgaard Olsson, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 389 days.

(21) Appl. No.: 18/455,826

(22) Filed: Aug. 25, 2023

(65) Prior Publication Data
US 2024/0073608 A1    Feb. 29, 2024

(30) Foreign Application Priority Data
Aug. 31, 2022    (EP) .................................... 22193159

(51) Int. Cl.
*H04R 5/04* (2006.01)
*H04M 3/42* (2006.01)
(Continued)

(52) U.S. Cl.
CPC .......... *H04R 5/04* (2013.01); *H04M 3/42229* (2013.01); *H04M 3/56* (2013.01); *H04R 3/005* (2013.01); *H04R 2203/12* (2013.01)

(58) Field of Classification Search
None
See application file for complete search history.

(56) References Cited

U.S. PATENT DOCUMENTS 9,338,544 B2 *  5/2016  Sun .................... H04N 5/772
9,928,847 B1    3/2018  Cleve et al.
(Continued)

FOREIGN PATENT DOCUMENTS

EP    1983799 A1    10/2008
WO    2021002862 A1    1/2021

OTHER PUBLICATIONS

The extended European search report issued in European application No. 22193159.5, dated Feb. 9, 2023.
(Continued)

*Primary Examiner* — Paul W Huber
(74) *Attorney, Agent, or Firm* — HSML P.C.

(57) ABSTRACT

A speakerphone is disclosed. The speakerphone comprises an interface, a speaker, a plurality of microphones, a processor, and a memory. The speakerphone is configured to: obtain a first plurality of microphone input signals of a conference; determine a first plurality of beamforming parameters; obtain a first internal output signal for provision of a first internal audio output signal; output the first internal audio output signal; obtain a third microphone input signal associated with the first internal audio output signal; obtain a second internal output signal for provision of a second internal audio output signal; output the second internal audio output signal; obtain a fourth microphone input signal associated with the second internal audio output signal; determine a first impulse response; determine a second impulse response; and determine one or more conference parameters indicative of a conference configuration, the one or more conference parameters including a first conference parameter; and output the first conference parameter.

15 Claims, 10 Drawing Sheets

(51) Int. Cl.
   *H04M 3/56*   (2006.01)
   *H04R 3/00*   (2006.01)

(56) References Cited

U.S. PATENT DOCUMENTS

| | | | |
|---|---|---|---|
| 11,637,932 B2 * | 4/2023 | Hansen | H04S 7/305 379/406.05 |
| 2008/0259731 A1 * | 10/2008 | Happonen | G10K 11/34 367/121 |
| 2019/0043515 A1 | 2/2019 | Cohen | |
| 2019/0096408 A1 | 3/2019 | Li et al. | |

OTHER PUBLICATIONS

Cohen et al., Joint Beamforming and Echo Cancellation Combining QRD Based Multichannel AEC and MVDR for Reducing Noise and Non-Linear Echo, 2018 26th European Signal Processing Conference (EUSIPCO), Sep. 3, 2018, pp. 6-10, XP033461741.

* cited by examiner

SPEAKERPHONE WITH BEAMFORMER-BASED CONFERENCE CHARACTERIZATION AND RELATED METHODS

This application claims priority from EP22193159.5 filed 31 Aug. 2022 and such priority application also hereby incorporated by reference into this US application.

The present disclosure pertains to the field of speakerphones, and in particular to speakerphones with beamformer-based conference characterization and related methods.

BACKGROUND

A speakerphone has a very complex signal processing pipeline that utilize cascaded algorithms to achieve satisfying sound quality. These algorithms have parameters that need to be set by an expert using test signals and are often selected as the best compromise. For example, a beamformer may have to be updated "slowly" to have good sound quality. However, slow updates will not provide a good sound quality when the speakerphone is in dynamic conditions.

SUMMARY

There is currently a lack of accurate and convenient technologies for characterizing a conference in an environment of a speakerphone. It is therefore relevant to extract information on the conference dynamics in the environment where the speakerphone is located.

Accordingly, there is a need for speakerphones with beamformer-based conference characterization and methods with beamformer-based conference characterization, which may mitigate, alleviate, or address the shortcomings existing and may provide improved beamformer-based conference characterization, e.g., when using a speakerphone in an environment.

A speakerphone is disclosed. The speakerphone may be seen as a speakerphone with beamformer-based conference characterization and/or monitoring. The speakerphone comprises an interface, a speaker, a plurality of microphones, e.g., including a first microphone, a processor, and a memory. The speakerphone is configured to obtain, using the plurality of microphones, a first plurality of microphone input signals of a conference. The speakerphone is configured to determine, using the processor and based on the first plurality of microphone input signals, a first plurality of beamforming parameters. The speakerphone is configured to obtain, such as using the processor, a first internal output signal for provision of a first internal audio output signal in the conference. The speakerphone is configured to output, such as using the speaker and based on the first internal output signal, the first internal audio output signal in the conference. The speakerphone is configured to obtain, such as using the plurality of microphones, a third microphone input signal associated with the first internal audio output signal. The speakerphone is configured to obtain, using the processor, a second internal output signal for provision of a second internal audio output signal in the conference. The speakerphone is configured to output, using the speaker and based on the second internal output signal, the second internal audio output signal in the conference. The speakerphone is configured to obtain, using the plurality of microphones, a fourth microphone input signal associated with the second internal audio output signal. The speakerphone is configured to determine, such as using the processor and based on the first internal output signal and the third microphone input signal, a first impulse response associated with the conference. The speakerphone is configured to determine, such as using the processor and based on the second internal output signal and the fourth microphone input signal, a second impulse response associated with the conference.

The speakerphone is configured to determine, such as using the processor and based on the first plurality of beamforming parameters, the first impulse response, and/or the second impulse response, one or more conference parameters, e.g., indicative of a conference configuration, the one or more conference parameters including a first conference parameter. Optionally, the speakerphone is configured to output, e.g., via the interface and/or the speaker, the first conference parameter.

Further, a system is disclosed. The system comprises a speakerphone as disclosed herein, and a server device as disclosed herein.

A method of operating a speakerphone is disclosed, such as a speakerphone as disclosed herein. The method comprises obtaining, such as using the speakerphone, a first plurality of microphone input signals of a conference. The method comprises determining, such as using the speakerphone and based on the first plurality of microphone input signals, a first plurality of beamforming parameters. The method comprises obtaining, such as using the speakerphone, a first internal output signal for provision of a first internal audio output signal in the conference. The method comprises outputting, such as using the speakerphone and based on the first internal output signal, the first internal audio output signal in the conference. The method comprises obtaining, such as using the speakerphone, a third microphone input signal associated with the first internal audio output signal. The method comprises obtaining, such as using the speakerphone, a second internal output signal for provision of a second internal audio output signal in the conference. The method comprises outputting, such as using the speakerphone and based on the second internal output signal, the second internal audio output signal in the conference. The method comprises obtaining, such as using the speakerphone, a fourth microphone input signal associated with the second internal audio output signal. The method comprises determining, such as using the speakerphone and based on the first internal output signal and the third microphone input signal, a first impulse response associated with the conference. The method comprises determining, such as using the speakerphone and based on the second internal output signal and the fourth microphone input signal, a second impulse response associated with the conference. The method comprises determining, such as using the speakerphone and based on the first plurality of beamforming parameters, the first impulse response, and/or the second impulse response, one or more conference parameters indicative of a conference configuration, the one or more conference parameters including a first conference parameter. Optionally, the method comprises outputting the first conference parameter.

The disclosed speakerphone system, speakerphone, and related methods provide improved beamformer-based conference characterization. In other words, the present disclosure may provide improved beamformer-based, such as audio-based, conference characterization, e.g., with improved conference parameter assumption(s). In other words, the present disclosure may provide improved accuracy and precision in determining conference parameter(s).

By extracting information on a conference, such as the dynamics and/or acoustics of an environment (such as a room) where a speakerphone is located, and/or information on the beamforming, the present disclosure may provide improved beamformer-based conference characterization. For example, a number of participants in a conference, a turn-taking in the conference, and/or the movement of a speaker and/or a participant in the conference may have an influence on how to perform signal processing of microphone input signals to provide output signals, and in turn have an influence on an audio quality of a rendered speech at a far-end. The present disclosure may provide an improved feedback on conference dynamics, conference characteristics, and/or conference acoustics in an environment, such as an environment where a speakerphone is located. In other words, the present disclosure may provide knowledge of a conference where a speakerphone is used. In other words, the present disclosure may provide conference information, such as meeting information, retrieval with a speakerphone. Furthermore, the present disclosure may enable to monitor the conference dynamics of a conference, such as conference in a meeting room. This may for example help tuning engineers in improving signal processing, such as improving a determination of signal processing parameters, e.g., beamforming parameters, for example in order to improve an audio quality when having a conference or a meeting. In other words, information on how the speakerphone is used in different environments may help tuning engineers in setting the parameters of the speakerphone to suit the use of the speakerphone, e.g., to suit the use of the speakerphone to a conference. The present disclosure may reduce the computational cost of the processing path for a speakerphone when a conference configuration remains constant, such as unchanged, and/or when no changes are detected in the acoustics of the conference.

It may be appreciated that the present disclosure may provide improved signal processing, such as improved tuning of a signal processing pipeline. The signal processing may be improved based on the conference parameter(s). In turn, the present disclosure may provide improved output signal(s), such as improved audio output quality at the far-end, such as for a far-end user. In other words, the present disclosure may provide an improved audio quality of speech at the far-end, e.g., during a call or a meeting.

An advantage of the present disclosure is that it is possible to improve the design of speakerphones to improve an audio quality of an output signal, such as speech quality at a far-end of a transmitted audio signal, and/or the design and/or configuration of conferences. The present disclosure improves the signal processing, such as beamforming, during a conference in certain acoustic settings, for in turn improving the audio quality of an output signal(s).

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
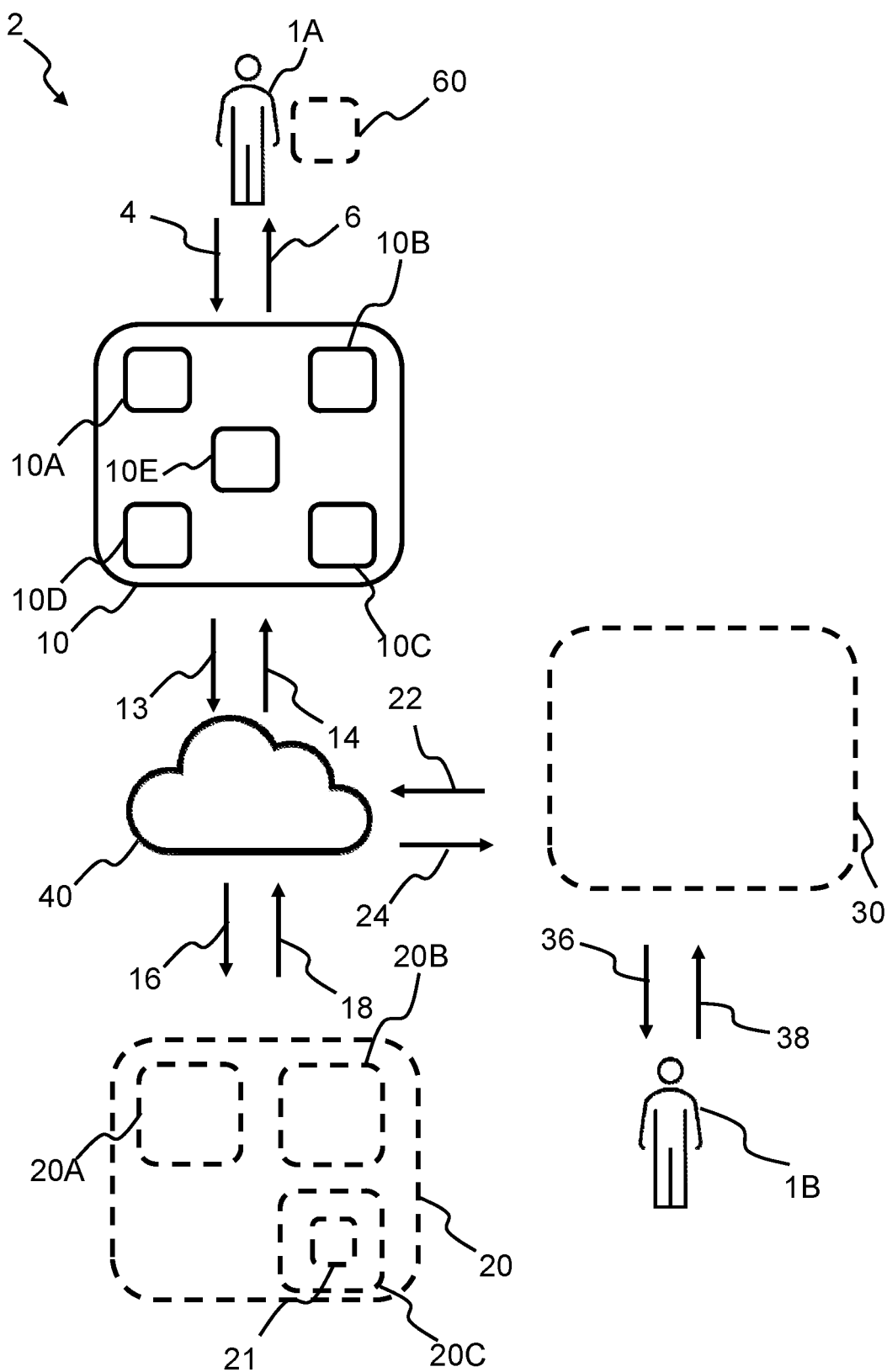
FIG. 1 schematically illustrates an example system according to the present disclosure, FIG. 2 schematically illustrates an example speakerphone according to the present disclosure, FIG. 3 schematically illustrates an example scenario where the disclosed technique is applied.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

A system is disclosed. The system may be seen as a speakerphone system. The system may be seen as a speakerphone system for performing calls, such as audio and/or video calls. The system may comprise one or more speakerphones as disclosed herein. The system, such as speakerphone system, may be seen as a system with beamformer-based conference characterization. In one or more example systems and/or speakerphones, the system comprises a server device as disclosed herein.

In one or more example systems, the system comprises a speakerphone as disclosed herein, and an electronic device as disclosed herein. The system may comprise one or more speakerphones, such as a plurality of speakerphones. The system may comprise a first speakerphone, a second speakerphone, a third speakerphone, and/or a fourth speakerphone.

In one or more example systems and/or speakerphones, the electronic device is an accessory device.

The electronic device and/or accessory device may for example be or comprise a mobile phone, such as a smartphone, a smart-watch, a conference hub, a smart-tv, smart-speakers, a tablet, a computer, such as a laptop computer or PC, or a tablet computer. In other words, the electronic device may for example be a user device, such as a mobile phone or a computer, configured to communicate with the speakerphone. In one or more example systems and/or speakerphones, the electronic device may be seen as a user accessory device, such as a mobile phone, a smart watch, a tablet, and/or a wearable gadget. In one or more example systems, the electronic device may comprise one or more transceivers for wireless communication. In one or more example systems, the accessory device may facilitate wired communication, such as by using a cable, such as an electrical cable.

A system is disclosed. The system comprises one or more speakerphones as disclosed herein and a server device as disclosed herein.

A speakerphone is disclosed. The speakerphone as disclosed herein may comprise an interface, a speaker, a plurality of microphones, e.g., including at least a first microphone and a second microphone, one or more processors, and a memory.

In one or more example speakerphones, the speakerphone may comprise one or more interfaces, one or more processors, and one or more memories. Further, the speakerphone may comprise a plurality of microphones, such as a first microphone, optionally a second microphone, optionally a third microphone and optionally a fourth microphone. The speakerphone may comprise one or more speakers, such as audio speakers, e.g., loudspeaker(s).

The speakerphone may be seen as an audio device configured to obtain audio signals, output audio signals, and process audio signals. The speakerphone may be seen as a conference speakerphone, e.g., configured to be used by a party (such as one or more users at a near-end) to communicate with one or more other parties (such as one or more users at a far-end). The speakerphone may be seen as a smart speakerphone. The speakerphone may be used for a conference and/or a meeting between two or more parties being remote from each other. The speakerphone may be used by one or more users in a vicinity of where the speakerphone is located, also referred to as a near-end.

The speakerphone may be a single speakerphone. The speakerphone may be seen as a plurality of interconnected speakerphones, such as a system, such as a speakerphone system. The system may comprise one or more users. It is noted that the term speaker may be seen as the user of the speakerphone. The speakerphone may be configured to process one or more audio signals. The speakerphone can be configured to output audio signals. The speakerphone may be configured to obtain, such as to receive via the interface and/or the microphone(s), the audio signals.

In one or more example speakerphones, the interface comprises a wireless transceiver, also denoted as a radio transceiver, and an antenna for wireless transmission and reception of an audio signal, such as for wireless transmission of the output signal and/or wireless reception of a wireless input signal. The speakerphone may be configured for wireless communication with one or more electronic devices, such as another speakerphone, a smartphone, a tablet, a computer and/or a smart watch. The speakerphone optionally comprises an antenna for converting one or more wireless input audio signals to antenna output signal(s). The speakerphone system, the speakerphone, and/or the electronic device may be configured for wireless communications via a wireless communication system, such as short-range wireless communications systems, such as Wi-Fi, Bluetooth, Zigbee, IEEE 802.11, IEEE 802.15, infrared and/or the like.

The speakerphone system, the speakerphone, and/or the electronic device may be configured for wireless communications via a wireless communication system, such as a 3GPP system, such as a 3GPP system supporting one or more of: New Radio, NR, Narrow-band IoT, NB-IoT, and Long Term Evolution—enhanced Machine Type Communication, LTE-M, millimeter-wave communications, such as millimeter-wave communications in licensed bands, such as device-to-device millimeter-wave communications in licensed bands.

In one or more example speakerphone systems, speakerphones, and/or electronic devices, the interface of the electronic device and/or the interface of the speakerphone comprises one or more of: a Bluetooth interface, Bluetooth low energy interface, and a magnetic induction interface. For example, the interface of the electronic device and/or the interface of the speakerphone may comprise a Bluetooth antenna and/or a magnetic interference antenna.

In one or more example speakerphones, the interface may comprise a connector for wired communication, via a connector, such as by using an electrical cable. The connector may connect one or more microphones to the speakerphone. The connector may connect the speakerphone to an electronic device, e.g., for wired connection.

The one or more interfaces can be or comprise wireless interfaces, such as transmitters and/or receivers, and/or wired interfaces, such as connectors for physical coupling. For example, the speakerphone may have an input interface configured to receive data, such as a microphone input signal. In one or more example speakerphones, the speakerphone can be used for all form factors in all types of environments, such as for headsets and/or video conference equipment. For example, the speakerphone may not have a specific microphone placement requirement. In one or more example speakerphones, the speakerphone may comprise an external microphone.

A speakerphone, the speakerphone comprising an interface, a speaker, and a plurality of microphones, the speakerphone comprising a processor and a memory, wherein the speakerphone is configured to: obtain, using the plurality of microphones, a first plurality of microphone input signals of a conference; determine, using the processor and based on the first plurality of microphone input signals, a first plurality of beamforming parameters; obtain, using the processor, a first internal output signal for provision of a first internal audio output signal in the conference; output, using the speaker and based on the first internal output signal, the first internal audio output signal in the conference; obtain, using the plurality of microphones, a third microphone input signal associated with the first internal audio output signal; obtain, using the processor, a second internal output signal for provision of a second internal audio output signal in the conference; output, using the speaker and based on the second internal output signal, the second internal audio output signal in the conference; obtain, using the plurality of microphones, a fourth microphone input signal associated with the second internal audio output signal; determine, using the processor and based on the first internal output signal and the third microphone input signal, a first impulse response associated with the conference; determine, using the processor and based on the second internal output signal and the fourth microphone input signal, a second impulse response associated with the conference; and determine, using the processor and based on the first plurality of beamforming parameters, the first impulse response, and the second impulse response, one or more conference parameters indicative of a conference configuration, the one or more conference parameters including a first conference parameter; and output the first conference parameter.

The speakerphone is configured to obtain, using the plurality of microphones, a plurality of microphone input signals of a conference, such as a first plurality of microphone input signals and/or a second plurality of microphone input signals of the conference. In one or more example speakerphones, the speakerphone is configured to obtain, such as using the processor and via the interface, a plurality microphone input signals of a conference, such as a first plurality of microphone input signals and/or a second plurality of microphone input signals, from the plurality of microphones, such as a first microphone, a second microphone, a third microphone and/or a fourth microphone. In one or more example speakerphones, the plurality of microphone input signals may be combined input signals obtained from two or more of the first microphone, the second microphone, the third microphone, and the fourth microphone. For example, the speakerphone may be configured to obtain a first primary microphone input signal using the first microphone, a first secondary microphone input signal using the second microphone, and/or a first tertiary microphone input signal using the third microphone. The first primary microphone input signal, the first secondary microphone input signal, and/or the first tertiary microphone input signal may be combined and be seen as the first plurality of microphone input signals.

The plurality of microphone input signals, such as a first plurality of microphone input signals and/or a second plurality of microphone input signals, may be representative of a reverberation of an audio output signal from the speaker (such as from one or more speakers and/or participants), such as a reverberation in the environment of the conference. The plurality of microphone input signals may be representative of a user impulse response, such as direct path and/or reverberation of an audio signal outputted from a user, such as from a participant of the conference.

In one or more example speakerphones, a microphone input signal may be indicative of an audio signal generated by user(s) of the speakerphone in the conference. In one or more example speakerphones, a microphone input signal may be indicative of an audio signal generated by the user(s) of the speakerphone while using the speakerphone in the conference. In other words, a microphone input signal may be indicative of user speech. In one or more example speakerphones, a microphone input signal may comprise one or more of the user's speech, such as a user speech in a near-field, interfering speech, such as a jamming speech from one or more speakers in the far-field, echo, noise, such as ambient noise, continuous noise, intermittent noise, impulsive noise, and/or low-frequency noise, and/or echo of one or more of the user's speech, and interfering speech.

In one or more example speakerphones, the speakerphone may be configured to obtain a microphone input signal from a distant microphone which is connected wirelessly with the speakerphone. In one or more example speakerphones, the speakerphone may be configured to obtain a microphone input signal from a distant microphone which is connected to the speakerphone via a cable, such as an audio cable and/or an electrical cable. In one or more example speakerphones, the user of the speakerphone may present within 10 meters range from the speakerphone while using the speakerphone. In an example scenario, a user may be using a speakerphone, such as a smart speaker for communication, positioned 10 meters apart. The speakerphone may be configured to obtain the user's speech, such as user commands, such as the user voice commands.

A conference may be seen as conference, such as a meeting, between two or more parties being located remotely from each other. In other words, the speakerphone may be seen as a conference speakerphone, e.g., configured to be used by a party (such as one or more users and/or participants at a near-end) to communicate with one or more other parties (such as one or more users and/or participants at a far-end). The speakerphone may be used for a conference and/or a meeting between two or more parties being remote from each other. The speakerphone may be used by one or more users in a vicinity of where the speakerphone is located, also referred to as a near-end and/or the conference. The conference may be seen as the room, such as meeting room, where the speakerphone is located, such as at the near-end. The conference may comprise a conference configuration and/or a conference setup. The conference configuration and/or setup may change and/or evolve in time. A conference setup and/or conference configuration may be seen as a physical setup of the environment where the speakerphone is located. In other words, the conference setup may be indicative of a setup of different elements in the environment where the speakerphone is located. For example, a conference setup and/or conference configuration may be indicative of a setup of building elements located in the environment of the speakerphone, such as a number of walls, a material of a wall surface, a material of a ceiling surface, a material of a floor surface, a number of doors, a material of a door, and/or a number of windows. For example, a conference setup and/or conference configuration may be indicative of a setup of objects located in the environment of the speakerphone, such as a number, a material, and/or a position of chairs, a number, a material, and/or a position of tables, a number, a material, and/or a position of lamps, and/or a number, a material, and/or a position of carpets. For example, a conference setup and/or conference configuration may be indicative of a setup of persons (such as users and/or participants) located in the environment of the speakerphone, such as a number and/or a position of persons in the conference. A conference setup and/or conference configuration may be indicative of a speakerphone setup. A speakerphone setup may comprise a number of speakerphones, a number of speakers of a speakerphone, a number of microphones of a speakerphone, a position of a speakerphone in the environment, and/or an orientation of a speakerphone in the environment (such as an orientation in view of the elements in the environment). The conference setup and/or conference configuration may be associated with one or more acoustic characteristics. For example, the acoustic characteristics of the conference setup may vary depending on the conference setup and/or conference configuration in the environment. In other words, the acoustic characteristics of the conference setup and/or conference configuration may vary depending on an arrangement of one or more elements present in the environment.

An environment, such as an environment of the conference, may be seen as an environment of the speakerphone, such as the surroundings of the speakerphone. For example, an environment of the conference may comprise a room where the speakerphone is located, such as a conference room, a meeting room, a boardroom, a meeting hall, and an auditorium. In one or more example speakerphones, the environment of the conference may comprise an interior of a building, such as inside environment, and/or an exterior of a building, such as an outside environment. In other words, the speakerphone may be located in an environment being inside a building, outside a building, and/or in a mixed environment comprising both inside parts and outside parts. An environment of the conference may include different elements, such as be composed of different elements. An environment of the conference may include building elements, such as walls, windows, and/or doors, objects, such as tables, chairs, lamps, and/or carpets, and/or persons, such as human beings located in the environment. The environment of the conference may have a certain acoustic setting, such as have certain acoustic characteristics, based on the elements present in the environment.

The speakerphone is configured to determine, such as using the processor and based on the first plurality of microphone input signals, a first plurality of beamforming parameters. In other words, the speakerphone may be configured to use beamforming on microphone input signals, such as on the first plurality of microphone input signals and/or a second plurality of microphone input signals. The speakerphone may be configured to, such as using the processor, apply the first plurality of beamforming parameters on the first plurality of microphone input signals. For example, the speakerphone may be configured to use beamforming that can be optimized for passing speech through while cancelling noise.

To determine a first plurality of beamforming parameters may comprise to determine a first beamforming scheme, such as a first beamforming scheme to be applied to the first plurality of microphone input signals. The speakerphone, such as the processor, may comprise a beamformer (such as a beamforming module) configured to use and/or apply the beamforming parameters, such as apply the first plurality of beamforming parameters, on the plurality of microphone input signals. The beamforming parameters, such as the first plurality of beamforming parameters and/or a second plurality of beamforming parameters, may be seen as speech beamforming parameters. In other words, the first plurality of beamforming parameters may be configured or determined to increase a relative amount of speech of a main speaker, such as a user of the speakerphone and/or a participant of the conference, in an external output signal to the far-end. An external output signal that has been beamformed may be seen as a beamforming output signal. The speakerphone may be configured to apply the first plurality of beamforming parameters on the first plurality of microphone input signals for provision of an external output signal to the far-end. A beamforming parameter may be seen as a weight of the beamformer, such as a weight to be applied by the beamformer. The first plurality of beamforming parameters may comprise one or more weights. The first plurality of beamforming parameters may be indicative of one or more beamforming lobes and/or beams. The number of beamforming lobes and/or beams may depend on the number of participants to the conference. A beamforming lobe or beamforming beam may have an orientation (such as a direction), and/or a width. A beamforming parameter may comprise one or more filter coefficients. It may be appreciated that a beamforming parameter may be determined e.g., via a minimum distortion less response, MVDR, algorithm, Linear constraint minimum variance, LCMV, algorithm, or by a generalized eigen value, GEV, decomposition.

In one or more example speakerphones, the speakerphone is configured to determine, using the processor and based on the second plurality of microphone input signals, a second plurality of beamforming parameters. In one or more example speakerphones, to determine the one or more conference parameters is based on the second plurality of beamforming parameters. The second plurality of beamforming parameters may be seen as updated beamforming parameters based on the second plurality of microphone input signals. In other words, the second plurality of beamforming parameters may be seen as updated beamforming parameters in view of the first plurality of beamforming parameters.

In one or more example speakerphones, the processor comprises a beamforming module configured to operate according to beamforming settings. The beamforming settings may comprise beamforming parameters. The beamforming module may be seen as and/or denoted a beamformer. In one or more example speakerphones, the speakerphone is configured to control, based one or more conference parameters, the beamforming module. In one or more example speakerphones, the speakerphone is configured to control, based on the first conference parameter, the beamforming module. In other words, the speakerphone, such using the processor, may be configured to determine beamforming parameters based on one or more conference parameters, such as the first conference parameter. For example, the speakerphone may be configured to control, such as using the processor, an updating frequency of the beamforming settings and/or parameters, based on the first conference parameter. In other words, the speakerphone may be configured to decrease or increase an updating frequency of the beamforming module, such as decrease or increase an updating frequency of the beamforming settings that the beamforming module is configured to operate according to.

In one or more example speakerphones, the first plurality of microphone input signals are obtained at a first time and the second plurality of microphone input signals are obtained at a second time. In one or more example speakerphones, the second time is after the first time. In other words, the speakerphone may be configured to obtain the second plurality of microphone input signals after the first plurality of microphone input signals. In other words, the speakerphone may be configured to determine the second plurality of beamforming parameters after the first plurality of beamforming parameters. It may be appreciated that, the second plurality of microphone input signals have been obtained later in time than the first plurality of microphone input signals. For example, the audio signal(s), such as second audio signal(s), that the second plurality of microphone input signals are based on, have been outputted by one or more audio sources after the audio signal(s), such as first audio signal(s), that the first plurality of microphone input signals are based on. It may be appreciated that the first plurality of beamforming parameters may be determined for a first time and the second plurality of beamforming parameters may be determined for a second time, where the second time is later than the first time.

A microphone input signal may be seen as the resulting signal(s) after the internal audio output signal was outputted by the speaker in the conference. In other words, a microphone input signal may be seen as a reaction of the conference to the internal audio output signal that was outputted. In other words, the microphone input signal may be collected as a result of the internal audio output signal outputted in the conference, such as an internal audio output signal based on a far-end input signal and/or a test signal.

The speakerphone is configured to obtain, such as using the processor and via the interface, an internal output signal for provision of an internal audio output signal in the conference. The speakerphone is configured to obtain, such as using the processor and via the interface, a first internal output signal for provision of a first internal audio output signal in the conference. In other words, the speakerphone is configured to obtain a first internal output signal for provision of a first internal audio output signal in the environment of the conference. In one or more example speakerphones, the speakerphone is configured to obtain the internal output signal, such as the first internal output signal and/or a second internal output signal, from a far-end, such as a far-end party or user(s).

In one or more example speakerphones, the speakerphone is configured to obtain the internal output signal, such as the first internal output signal and/or a second internal output signal, from the memory and/or from a server device. The internal output signal, such as the first internal output signal and/or a second internal output signal, may be indicative of an audio signal generated by user(s) at the far-end. For example, the internal audio output signal, such as the first internal audio output signal and/or the second internal audio output signal, may be indicative of an audio signal generated by user(s) at the far-end. In other words, the internal output signal, such as the first internal output signal and/or a second internal output signal, may be indicative of speech from the far-end. In one or more example speakerphones, the internal output signal, such as the first internal output signal and/or a second internal output signal, is based on a test signal obtained from the memory and/or the server device.

The speakerphone is configured to output, such as using the speaker and based on the internal output signal, the internal audio output signal in the conference. The speakerphone is configured to output, such as using the speaker and based on the first internal output signal, the first internal audio output signal in the conference. In other words, the speakerphone may be configured to output, via the speaker and based on the first internal output signal, the first internal audio output signal in the environment of the conference. The internal audio output signal, such as the first internal audio output signal and/or a second internal audio output signal, may be seen as an output of the speaker at a near-end where the speakerphone and the user(s) of the speakerphone are located.

The speakerphone is configured to obtain, using the plurality of microphones, a third microphone input signal associated with the first internal audio output signal. In one or more example speakerphones, the speakerphone is configured to obtain, such as using the processor and via the plurality of microphones, a third microphone input signal from one or more microphones, such as a first microphone, a second microphone, a third microphone and/or a fourth microphone. In one or more example speakerphones, the third microphone input signal may be a combined input signal obtained from two or more of the first microphone, the second microphone, the third microphone, and the fourth microphone. The third microphone input signal may be seen as the resulting signal(s) after the first internal audio output signal was outputted by the speaker in the conference, such as in the environment of the conference. In other words, the third microphone input signal may be seen as a reaction of the conference, such as a reaction of the environment of the conference, to the first internal audio output signal that was outputted. The third microphone input signal may be representative of a direct path of the first internal audio output signal from the speaker to a microphone, such as the plurality of microphones, a reverberation of the first internal audio output signal from the speaker, such as a reverberation in the environment of the first internal audio output signal outputted from the speaker, and/or a user impulse response, such as a reverberation of an internal audio output signal on a user.

In one or more example speakerphones, the speakerphone may be configured to obtain the third microphone input signal from a distant microphone which is connected wirelessly with the speakerphone. In one or more example speakerphones, the speakerphone may be configured to obtain the third microphone input signal from a distant microphone which is connected to the speakerphone via a cable, such as an audio cable and/or an electrical cable. In one or more example speakerphones, the user of the speakerphone may present within 10 meters range from the speakerphone while using the speakerphone. In an example scenario, a user may be using a speakerphone, such as a smart speaker for communication, positioned 10 meters apart. The speakerphone may be configured to obtain the user's speech, such as user commands, such as the user voice commands.

The speakerphone is configured to obtain, such as using the processor and via the interface, an internal output signal for provision of an internal audio output signal in the conference. The speakerphone is configured to obtain, such as using the processor and via the interface, a second internal output signal for provision of a second internal audio output signal in the conference. In other words, the speakerphone is configured to obtain a second internal output signal for provision of a second internal audio output signal in the environment of the conference.

The speakerphone is configured to output, such as using the speaker and based on the internal output signal, the internal audio output signal in the conference. The speakerphone is configured to output, such as using the speaker and based on the second internal output signal, the second internal audio output signal in the conference. In other words, the speakerphone may be configured to output, via the speaker and based on the second internal output signal, the second internal audio output signal in the environment of the conference.

The speakerphone is configured to obtain, using the plurality of microphones, a fourth microphone input signal associated with the second internal audio output signal. In one or more example speakerphones, the speakerphone is configured to obtain, such as using the processor and via the plurality of microphones, a fourth microphone input signal from one or more microphones, such as a first microphone, a second microphone, a third microphone and/or a fourth microphone. In one or more example speakerphones, the fourth microphone input signal may be a combined input signal obtained from two or more of the first microphone, the second microphone, the third microphone, and the fourth microphone. The fourth microphone input signal may be seen as the resulting signal(s) after the second internal audio output signal was outputted by the speaker in the conference, such as in the environment of the conference. In other words, the fourth microphone input signal may be seen as a reaction of the conference, such as a reaction of the environment of the conference, to the second internal audio output signal that was outputted. The fourth microphone input signal may be representative of a direct path of the second internal audio output signal from the speaker to a microphone, such as the plurality of microphones, a reverberation of the second internal audio output signal from the speaker, such as a reverberation in the environment of the second internal audio output signal outputted from the speaker, and/or a user impulse response, such as direct path and/or reverberation of an audio signal outputted from a user. The description in relation to the third microphone input signal may also apply to the description of the fourth microphone input signal.

In one or more example speakerphones, the third microphone input signal is obtained at a third time and the fourth microphone input signal is obtained at a fourth time, and wherein the fourth time is after the third time. In other words, the fourth microphone input signal is obtained later in time than the third microphone input signal. For example, the obtaining of the fourth microphone input signal may occur later in time than the obtaining of the third microphone input signal.

In one or more example speakerphones, the first internal audio output signal is configured to be outputted at a first output time and the second internal audio output signal is configured to be outputted at a second output time. In one or more example speakerphones, the second output time is after the first output time.

The speakerphone is configured to determine, using the processor and based on the first internal output signal and the third microphone input signal, a first impulse response associated with the conference. The first impulse response may be seen as an acoustic impulse response. The first impulse response may be seen as an impulse response between the speaker, e.g., being an excitation source, of the speakerphone and the microphone(s) of the speakerphone, such as the first microphone and/or the second microphone. The first impulse response may be influenced by the speakerphone itself and the conference, such as the environment of the conference, e.g., the room, where the speakerphone is located. It may be appreciated that the first impulse response reflects one or more acoustic paths from the speaker to the microphone(s) after outputting the first internal audio output signal. In one or more example speakerphones, the speakerphone is configured to adjust and/or compensate for the microphone(s) and/or the speaker. In other words, the speakerphone is configured to adjust and/or compensate for one or more transfer functions of the microphone(s) and/or the speaker. For example, the speakerphone is configured to compensate for one or more acoustic paths from the speakerphone, such as from the speaker of the speakerphone, to the microphone(s) of the speakerphone. The first impulse response may be associated with a first conference setup and/or first conference configuration. In other words, the first impulse response reflects a first conference setup and/or first conference configuration in a time interval between the first internal audio output signal is outputted and the third microphone input signal is obtained at the plurality of microphones.

The speakerphone is configured to determine, using the processor and based on the second internal output signal and the fourth microphone input signal, a second impulse response associated with the conference. The second impulse response may be seen as an acoustic impulse response. The second impulse response may be seen as an impulse response between the speaker, e.g., being an excitation source, of the speakerphone and the microphone(s) of the speakerphone, such as the first microphone and/or the second microphone. The second impulse response may be influenced by the speakerphone itself and the conference, such as the environment of the conference, e.g., the room, where the speakerphone is located. It may be appreciated that the second impulse response reflects one or more acoustic paths from the speaker to the microphone(s) after outputting the second internal output signal. In one or more example speakerphones, the speakerphone is configured to adjust and/or compensate for the microphone(s) and/or the speaker. In other words, the speakerphone is configured to adjust and/or compensate for one or more transfer functions of the microphone(s) and/or the speaker. The second impulse response may be associated with a second conference setup and/or second conference configuration. In other words, the second impulse response reflects a second conference setup and/or second conference configuration in a time interval between the second internal audio output signal is outputted and the fourth microphone input signal is obtained at the plurality of microphones. It may be appreciated that when one or more elements of the conference change, such as one or more elements of the conference configuration and/or conference setup change, the second impulse response may be different from the first impulse response.

The speakerphone is configured to determine, such as using the processor and based on the first plurality of beamforming parameters, the first impulse response, and the second impulse response, one or more conference parameters indicative of a conference configuration. In one or more example speakerphones, the one or more conference parameters include a first conference parameter. In other words, the speakerphone may be configured to determine, such as using the processor and based on the first plurality of beamforming parameters, the first impulse response, and the second impulse response, a first conference parameter. The one or more conference parameters may comprise a second conference parameter, a third conference parameter, a fourth conference parameter, and/or a fifth conference parameter. A conference parameter may be indicative of one or more elements of the conference. In other words, the conference parameter may be indicative of one or more elements present in the environment of the conference where the speakerphone is located. A conference parameter may be indicative of one or more dynamics of the conference. A conference parameter may be seen as and/or denoted as meeting information. A conference parameter may be seen as indicative of an acoustic parameter of the conference, such as an acoustic parameter in the environment of the conference. In other words, a conference parameter may be indicative of an acoustic characteristic in the environment of the conference. A conference parameter may also be denoted a room parameter, such as meeting room parameter. For example, the first conference parameter may be indicative of a first meeting parameter of the conference, a second conference parameter may be indicative of a second meeting parameter of the conference, a third conference parameter may be indicative of a third meeting parameter of the conference, the fourth conference parameter may be indicative of a fourth meeting parameter of the conference, and/or the fifth conference parameter may be indicative of a fifth meeting parameter of the conference.

In one or more example speakerphones, the speakerphone is configured to transmit, via the interface, the first impulse response, the second impulse response, the first plurality of beamforming parameters, the second plurality of beamforming parameters, and/or the first conference parameter to a server device.

It is an advantage that the speakerphone outputs an impulse response, such as the first impulse response, the second impulse response, the first plurality of beamforming parameters, the second plurality of beamforming parameters, and/or conference parameters to the server device. In other words, this may avoid privacy and/or confidentiality issues at the server device by only transmitting impulse responses, beamforming parameters, and/or conference parameters. An impulse response, a beamforming parameter, and/or a conference parameter may not contain any private or confidential data and is therefore safe to transmit to a server device, without having concerns about sharing private or confidential information.

In one or more example speakerphones, the speakerphone is configured to output the first conference parameter. In one or more example speakerphones, the speakerphone is configured to output, such as via the speaker and/or the interface and using the processor, the first conference parameter. In one or more example speakerphones, the speakerphone is configured to output, such as via the speaker and/or the interface and using the processor, the one or more conference parameters. In one or more example speakerphones, the speakerphone is configured to output the first conference parameter to the memory, such as to store the first conference parameter in a part of the memory. In one or more example speakerphones, the speakerphone is configured to output, via the interface, the first conference parameter to a server device, e.g., via an electronic device as disclosed herein and/or via a global network such as the internet and/or a local network. For example, the speakerphone may be configured to output the first conference parameter to an IT department in charge of the conference setup, conference configuration, and/or in charge of tuning the beamforming module, such as tuning beamforming parameters. By providing the first conference parameter, an improved feedback on conference dynamics and conference acoustics, such as in the environment where a speakerphone is located, is achieved. In other words, the present disclosure may provide knowledge on the conference where a speakerphone is used. Furthermore, the first conference parameter may enable to monitor turn taking, speaker movements, and/or acoustics in the conference. This may for example help an IT service in improving signal processing, such as beamforming, during conferences e.g., in order to improve an audio quality when having a meeting. Further, the provision of the first conference parameter may enable an improved assessment of beamforming parameters, such as faster adaptation of the beamforming parameters for the conference. In one or more example speakerphones, to output the first conference parameter comprises to output, e.g., to the user and via the speaker of the speakerphone, an audio signal representing the first conference parameter.

In one or more example speakerphones, to output the first conference parameter comprises to display, e.g., via the interface of the electronic device as disclosed herein, a user interface representing the first conference parameter. In one or more example speakerphones, the speakerphone may comprise a display, and to output the first conference parameter comprises to display, e.g., via the display of the speakerphone, a user interface representing the first conference parameter.

Outputting the first conference parameter may comprise displaying a user interface indicative of the first conference parameter. In one or more example speakerphones, outputting the first conference parameter may comprise outputting, via the interface of the electronic device, a first conference parameter associated with a first conference configuration, a second conference parameter associated with a second conference configuration, a third conference parameter associated with a third conference configuration, etc.

A user interface may comprise one or more, such as a plurality of, user interface objects. For example, the user interface may comprise one or more user interface objects, such as a first user interface object and/or a second user interface object. A user interface object may refer herein to a graphical representation of an object that is displayed on an interface of the electronic device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user. To output the first conference parameter may comprise to output a first conference parameter comprising one or more of text (such as a text string) and/or a phrase, image data (such as one or more images), a sound, an audio message, and/or a user interface object comprising one or more of the previous. For example, to output the first conference parameter may comprise to output an first conference parameter comprising a report of the conference configuration in the environment and/or a report of the acoustic characteristics of the conference. For example, to output the first conference parameter may comprise to output a conference configuration representation comprising the first conference parameter, such as providing information regarding the conference configuration and/or the dynamics in the conference.

In one or more example speakerphones, to determine the one or more conference parameters comprises to determine a first difference between the first plurality of beamforming parameters and the second plurality of beamforming parameters. In other words, the speakerphone is configured to determine a first difference between the first plurality of beamforming parameters and the second plurality of beamforming parameters. It may be appreciated that, to determine a first difference between the first plurality of beamforming parameters and the second plurality of beamforming parameters may comprise to compare the first plurality of beamforming parameters and the second plurality of beamforming parameters. For example, the first plurality of beamforming parameters may be determined to increase the speech and/or voice of a first speaker speaking from a first position, while the second plurality of beamforming parameters may be determined to increase the speech and/or voice of a second speaker speaking from a second position. The first difference may be indicative of a difference in beamforming weights. The first difference may be indicative of a difference in beamforming lobes and/or beamforming beams, such as difference in the number, widths, and/or orientations of one or more beamforming lobes. The first difference may be indicative of a beamformer update. It may be appreciated that, to determine a first difference between the first plurality of beamforming parameters and the second plurality of beamforming parameters may comprise to monitor the weights of the beamformer. For example, to determine a first difference between the first plurality of beamforming parameters and the second plurality of beamforming parameters may comprise to determine a difference in the patterns of beamforming parameters. To determine a difference in beamforming parameters may comprise to determine whether the beamforming parameters are stable, e.g., to determine whether the beamforming parameters stay substantially the same in a time period of e.g., 0.5 s.

In one or more example speakerphones, the speakerphone is configured to, in accordance with a determination that the first difference satisfies a first criterion, set the first conference parameter to indicate a change in audio source position in the conference, such as one or more audio sources. In other words, the speakerphone is configured to, in accordance with a determination that the first difference satisfies a first criterion, set the first conference parameter to indicate a change of a position of a speaker in the conference, such as a change in position of a participant in the conference. The first criterion may be seen as a criterion indicative of a change in beamforming parameters. The first criterion may comprise a first threshold. To determine whether the first difference satisfies the first criterion may comprise to determine whether the first difference is above or equal to the first threshold. The first threshold may for example indicate a threshold for the first difference above which the first difference is indicative of a change in audio source position in the conference. The first criterion may be seen as a beamforming change criterion. The first criterion may be seen as a position criterion. For example, to determine whether the first difference satisfies the first criterion may comprise to determine whether the first difference satisfies the position criterion. In other words, the first difference may satisfy the first criterion when a speaker in the conference has moved from a first position to a second position before and/or at a beamformer update, and the second position is remote enough according to the first criterion. In other words, the first difference may satisfy the first criterion when a turn-taking has taken place in the conference before and/or at a beamformer update, and the two speakers that are taking turn are remote enough according to the first criterion. It may be appreciated that, the first difference may satisfy the first criterion when a change in audio source has happened between the obtaining of the first plurality of microphone input signals and the obtaining of the second plurality of microphone input signals.

When it is determined that the first difference satisfies the first criterion, the speakerphone may be configured to determine that a change in audio source position has taken place, and to update an audio source parameter associated with the conference. The first conference parameter may comprise the audio source parameter. In other words, the speakerphone may be configured to update a conference configuration based on a determination of whether the first difference satisfies the first criterion. For example, to set the first conference parameter to indicate a change in audio source position in the conference may comprise to update a conference configuration. For example, to set the first conference parameter to indicate a change in audio source position in the conference may comprise to update a position of an audio source, such as an active audio source, in the conference.

It may be appreciated that, the beamformer is focusing on an active speaker in the conference and thereby determines updated beamforming parameters when a change in audio source occurs in the conference. The updated beamforming parameters may be the second plurality of beamforming parameters after the first plurality of beamforming parameters. It may be appreciated that, to determine whether the first difference satisfies the first criterion may be seen as monitoring the weights of the beamformer. By monitoring the beamforming parameters, such as weights, of the beamformer, the speakerphone may be configured to extract and/or harvest information on the conference dynamics, such as turn-taking, number of participants, change in audio source, a speaker moving, and/or change in acoustics in the conference.

In one or more example speakerphones, to determine the one or more conference parameters comprises to determine a second difference between the first impulse response and the second impulse response.

In other words, the speakerphone is configured to determine a second difference between the first impulse response and the second impulse response. It may be appreciated that, to determine a second difference between the first impulse response and the second impulse response may comprise to compare the first impulse response and the second impulse response. To determine a second difference between the first impulse response and the second impulse response may comprise to determine whether the first impulse response and the second impulse response are different. For example, the first impulse response may be indicative of a first conference configuration and/or first conference setup, while the second impulse response may be indicative of a second conference configuration and/or second conference setup. The second difference may be indicative of a difference between the acoustics in the conference after outputting the first internal audio output signal and the acoustics in the conference after outputting the second internal audio output signal. In other words, the second difference may be indicative of a difference between a first conference configuration and a second conference configuration.

In one or more example speakerphones, the speakerphone is configured to, in accordance with the second difference satisfying a second criterion, set the first conference parameter to indicate a change in acoustics in the conference.

In other words, the speakerphone is configured to, in accordance with a determination that the second difference satisfies a second criterion, set the first conference parameter to indicate a change in acoustics in the conference, such as a change in conference configuration resulting in a change in acoustics in the conference. The second criterion may be seen as a criterion indicative of a change in impulse responses. The second criterion may comprise a second threshold. To determine whether the second difference satisfies the second criterion may comprise to determine whether the second difference is above or equal to the second threshold. The second threshold may for example indicate a threshold for the second difference above which the second difference is indicative of a change in acoustics in the conference. The second criterion may be seen as an impulse response criterion. The second criterion may be seen as an acoustics criterion. For example, to determine whether the second difference satisfies the second criterion may comprise to determine whether the second difference satisfies the acoustics criterion. In other words, the second difference may satisfy the second criterion when one or more elements in the conference have changed and/or moved so as to change the acoustics in the conference enough according to the second criterion. For example, when a participant and/or an object in the conference has moved from a first position to a second position the second impulse response may be different from the first impulse response. In other words, the second difference may satisfy the second criterion when a change in acoustics has taken place in the conference between the determination of the first impulse response and the determination of the second impulse response, and that the change in acoustics is large enough according to the second criterion. It may be appreciated that, the second difference may satisfy the second criterion when a change in acoustics has happened between the obtaining of the third microphone input signal and the obtaining of the fourth microphone input signal.

When it is determined that the second difference satisfies the second criterion, the speakerphone may be configured to determine that a change in acoustics in the conference has taken place, and to update an acoustics parameter associated with the conference. The first conference parameter may comprise the acoustics parameter. In other words, the speakerphone may be configured to update a conference configuration based on a determination of whether the second difference satisfies the second criterion. For example, to set the first conference parameter to indicate a change in acoustics in the conference may comprise to update a conference configuration. For example, to set the first conference parameter to indicate a change in acoustics in the conference may comprise to update a position of one or more elements in the conference configuration and/or a content of elements in the conference.

It may be appreciated that, to determine whether the second difference satisfies the second criterion may be seen as monitoring the impulse response(s) in the conference. By monitoring the impulse response(s), the speakerphone may be configured to extract information on the conference dynamics, such as turn-taking, number of participants, change in audio source, a speaker moving, and/or change in acoustics in the conference.

In one or more example speakerphones, the speakerphone is configured to, in accordance with a determination that the first difference satisfies the first criterion and in accordance with a determination that the second difference does not satisfy the second criterion, set, such as using the processor, the first conference parameter to indicate a turn taking in the conference. In other words, when the impulse response in the conference is determined to be stable and the beamformer is changing beamforming parameters sufficiently, it may be determined that a turn taking is occurring in the conference, such as a turn taking in a conversation in the conference. In one or more example speakerphones, when it is determined that the first difference satisfies the first criterion and that the second difference does not satisfy the second criterion, the speakerphone may be configured to determine that a turn taking has taken place in the conference, and to update a conference configuration parameter associated with the conference. It may be appreciated that, when the first criterion is satisfied and the second criterion is not satisfied, e.g., when these two conditions are fulfilled, a turn taking may be detected in the conference, such as a turn taking between two or more participants in the conference. A turn-taking may be seen as a change in the person speaking in the conference. For example, the participants in the conference may take turns at speaking. When the participants in the conference take turns at speaking the audio source position changes, since the positions of the participants in the conference may be different. Therefore, when the participants in the conference take turns at speaking, the beamforming parameters of a beamformer are changing in order to capture and/or increase the speech from the participant that is actively speaking. By tracking the impulse response and the change in beamforming parameters it may be possible to discriminate the change in audio source position from the turn taking in a conference. In other words, when the second difference does not satisfy the second criterion, the impulse response in the conference may be seen as stable. For example, when the second difference between the first impulse response and the second impulse response is smaller than the second threshold, the impulse response in the conference, such as room impulse response, may be seen as stable.

In one or more example speakerphones, the speakerphone is configured to, in accordance with a determination that the first difference satisfies the first criterion and in accordance with a determination that the second difference does not satisfy the second criterion, set, such as using the processor, the first conference parameter to indicate a turn taking in the conference and to indicate a speaker being stationary in the conference. In other words, in accordance with a determination that the first difference satisfies the first criterion and in accordance with a determination that the second difference does not satisfy the second criterion it may be determined that a turn-taking is taking place and that there is substantially no change in acoustics in the conference. For example, in accordance with a determination that the first difference satisfies the first criterion and in accordance with a determination that the second difference does not satisfy the second criterion, it may be determined that a turn-taking has taken place and that the one or more participants in the conference are stationary. Said differently, when the beamforming module or beamformer updates beamforming parameters and that the impulse response in the environment of the conference is steady, it may be determined that a turn-taking has taken place and that the one or more participants in the conference are stationary.

In one or more example speakerphones, the speakerphone is configured to determine a third plurality of beamforming parameters based on the first conference parameter, where the third plurality of beamforming parameters are associated with one or more participants of the conference. In other words, the speakerphone is configured to, in accordance with the first conference parameter being indicative of a turn taking occurring in the conference and indicative of a speaker being stationary in the conference, determine, such as using the processor, a third plurality of beamforming parameters. To determine the third plurality of beamforming parameters may comprise to determine the third plurality of beamforming parameters based on the first conference parameter being indicative of a turn-taking and one or more speakers being stationary. In one or more example speakerphones, to determine the third plurality of beamforming parameters may comprise to determine the third plurality of beamforming parameters based on the first conference parameter being indicative of a turn-taking and one or more speakers being stationary, and the last determined beamforming parameters. Said differently, the third plurality of beamforming parameters may be set to be the last determined beamforming parameters, such as the first plurality of beamforming parameters and/or the second plurality of beamforming parameters. The third plurality of beamforming parameters may be associated with one or more stationary positions of the one or more participants (such as speakers) in the conference.

In one or more example speakerphones, the speakerphone is configured to store the third plurality of beamforming parameters and use the third plurality of beamforming parameters as beamforming settings for the beamforming module. In other words, the speakerphone, such as the beamforming module, may be configured to use the third plurality of beamforming parameters as beamforming settings until one or more speakers in the conference change position (such as until one or more speakers move). The third plurality of beamforming parameters may be seen as stable beamforming parameters. It may be appreciated that the memory of the speakerphone may store the stable beamforming parameters, such as filter patterns. The stable beamforming parameters may be associated with one or more conference participants. It is an advantage that the beamforming parameters associated with the one or more participants of the conference may be stored and used as a starting point for future beamforming, since it obviates the need for determining (such as generating) new beamforming parameters for each participant at every update of the beamforming parameters. In other words, the third plurality of beamforming parameters may be used as beamforming settings for a next beamforming iteration. The beamforming parameters, such as stable filter patterns, may be used as starting points for calculating later beamforming parameters, such as filter patterns, or be reused, thus limiting the amount of processing power required to calculate new beamforming parameters from scratch. By already having pre-determined beamforming parameters, an improved audio output quality at the far-end is achieved.

The beamforming parameters may be seen as customized to the conference configuration, such as the current conference configuration. For example, if there is no change in impulse response, it may be determined that no movement has occurred, thus the stable filter patterns may be reused and/or used as starting points to quickly converge on a speaker or participant in the conference.

In one or more example speakerphones, the speakerphone is configured to, in accordance with a determination that the first difference satisfies the first criterion and in accordance with a determination that the second difference satisfies the second criterion, set, such as using the processor, the first conference parameter to indicate a speaker moving in the conference.

In other words, when the impulse response in the conference is determined to be changing and the beamformer is changing beamforming parameters sufficiently, it may be determined that a speaker in the conference has moved, such as one or more speakers are moving in the conference. In one or more example speakerphones, when it is determined that the first difference satisfies the first criterion and that the second difference satisfies the second criterion, the speakerphone may be configured to determine that a speaker has moved in the conference, and to update a movement parameter associated with the conference. To set the first conference parameter to indicate a speaker moving in the conference may comprise to update a movement parameter associated with the conference. The movement parameter may comprise one or more positions, such as one or more positions with respect to the speakerphone. It may be appreciated that, when the first criterion is satisfied and the second criterion is satisfied, e.g., when these two conditions are fulfilled, a speaker movement may be detected in the conference, such as a speaker moving from a first position to a second position in the conference. A speaker moving may be seen as a change in position of the person actively speaking in the conference. For example, the participants in the conference may walk around when speaking. When the active speaker in the conference is moving when speaking the audio source position changes, since the position of the speaker in the conference changes. Therefore, when the active speaker in the conference moves, the beamforming parameters of a beamformer are changing in order to capture and/or increase the speech from the speaker, and the acoustics in the conference changes as well. By tracking the impulse response and the change in beamforming parameters it may be possible to discriminate a speaker moving from a turn taking in a conference. In other words, when the second difference satisfies the second criterion, the impulse response in the conference may be seen as unstable or unsteady. For example, when the second difference between the first impulse response and the second impulse response is larger or equal to the second threshold, the impulse response in the conference, such as room impulse response, may be seen as changing.

In one or more example speakerphones, the processor comprises an echo canceller, such as an echo canceller module. In one or more example speakerphones, to determine an impulse response, such as the first impulse response and/or the second impulse response, comprises to reduce, using the echo canceller, one or more echo components from a microphone input signal, such as third microphone input signal and/or a fourth microphone input signal. In one or more example speakerphones, the speakerphone is configured to reduce, such as using the echo canceller and based on the impulse response, such as the first impulse response and/or the second impulse response, and/or the first conference parameter, one or more components from the microphone input signal, such as third microphone input signal and/or a fourth microphone input signal. The reduction of one or more echo components from the microphone input signal may be done subsequently to determining the impulse response. In one or more example speakerphones, the processor comprises a noise reductor for reducing noise from the microphone input signal, such as a noise reductor module.

In other words, the processing pipeline of the speakerphone includes an echo canceller. The echo canceller may be configured to remove an echo path from the speaker of the speakerphone to the one or more microphone(s). This removal may be based on an estimate of the impulse response from the speaker to the one or more microphone(s). It may be appreciated, that the estimated impulse response provides an insight of the acoustic sound field of the environment of the conference, such as room, where the speakerphone is located. It may be appreciated, that the impulse response may be updated in time, based on changes of the conference configuration in the conference. In other words, the estimation of the impulse response may be updated to reflect changes in the sound field.

In one or more example speakerphones, the impulse response is estimated from the echo canceller (such as echo canceller processing block), to suppress echo. For example, the estimation of the impulse response may be a step in the processing of reducing echo components, such as suppressing echoes. In one or more example speakerphones, the speakerphone is configured to determine, using the echo canceller and based on the internal output signal and the microphone input signal, the impulse response.

In one or more example speakerphones, the speakerphone is configured to control, such as using the processor and based on the first conference parameter, the echo canceller. In other words, the speakerphone may be configured to adjust the echo canceller based on the first conference parameter. For example, the speakerphone may be configured to adjust the echo canceller based on one or more of: a number of participants in the conference, a position of a speaker in the conference, a movement of a speaker in the conference, a size of an environment of the conference, turn taking information, and a level of absorption in the conference.

In one or more example speakerphones, the conference configuration comprises one or more of: a number of participants in the conference, a position of a speaker in the conference, a size of an environment of the conference, turn taking information, and a level of absorption in the conference. In other words, the conference configuration may be indicative of one or more of: a number of participants in the conference, a position of a speaker in the conference, a size of an environment of the conference, turn taking information, and a level of absorption in the conference. In one or more example speakerphones, the conference configuration comprises one or more conference configuration parameters such as one or more of: a participant parameter, a position parameter, a size parameter, turn-taking parameter, a movement parameter, and an absorption parameter. In other words, the speakerphone may be configured to update a conference configuration based on the first conference parameter. For example, the speakerphone may be configured to update a conference configuration based on the conference dynamics indicated by the first conference parameter. In one or more example speakerphones, the speakerphone may be configured to control the beamforming module based on the conference configuration. A position of a speaker may be seen as one or more positions of one or more speakers and/or participants in the conference. The conference configuration may be indicative of one or more elements of the conference as described herein. The conference configuration may comprise information such as a size of a conference, e.g., dimensions of a room, position of the speakerphone in the conference, position of the one or more participants in the conference, a turn-taking frequency, and/or objects in the conference. For example, a conference parameter may comprise a movement parameter indicative of movement in the conference, such as movement within the meeting room of one or more participants. For example, a conference parameter may comprise a turn-taking parameter indicative of turn-taking characteristics in the conference and/or between the far-end and the near-end. It may be appreciated that the conference parameter may be indicative of double talk in the conference and/or between the far-end and the near-end, such as double talk between two or more participants of the conference.

In one or more example speakerphones, the processor comprises machine learning circuitry configured to operate according to a machine learning model. In one or more example speakerphones, to determine the one or more conference parameters comprise to determine the one or more conference parameters, based on the first plurality of beamforming parameters, the first impulse response, and the second impulse response, using the machine learning model and/or machine learning circuitry.

In other words, the speakerphone may comprise one or more processors comprising a machine learning engine configured to operate according to the machine learning model. The machine learning circuitry may be seen as a predictor circuitry configured to operate according to a prediction model. The machine learning circuitry may be configured to predict, based on the first plurality of beamforming parameters, the first impulse response, and the second impulse response, one or more conference parameters using the prediction model.

The machine learning model may for example comprise or make use of a neural network, artificial intelligence, deep learning, and/or machine learning. The machine learning model may be seen as a model for conference characterization, such as for beamformer-based conference characterization.

In one or more example speakerphones and/or speakerphone systems, the machine learning model comprises model layers including an input layer, one or more intermediate layers, and an output layer for provision of the one or more conference parameters, such as the first conference parameter. In one or more example speakerphones and/or speakerphone systems, the machine learning model comprises a neural network. In one or more example speakerphones and/or speakerphone systems, the machine learning model comprises neural network layers including an input layer, one or more intermediate layers, and an output layer for provision of one or more conference parameters, such as the first conference parameter. In other words, the input layer, the one or more intermediate layers, and/or the output layer may be seen as layers of a machine learning model such as layers of a neural network. The one or more intermediate layers may be considered as hidden layers (such as hidden features). The one or more intermediate layers may include a first intermediate layer. The machine learning model may comprise a look-up table with a plurality of parameters, such as at least four parameters.

A model as referred to herein (such as the machine learning model) may be seen as a model and/or a scheme and/or a mechanism and/or a method configured to provide, based on operational data (such as beamforming parameters and/or one or more impulse responses) and/or a previous model, one or more conference parameters.

In one or more example speakerphones and/or speakerphone systems, the model as referred to herein may be stored on a non-transitory storage medium (for example, on the memory of the speakerphone). The model may be stored on a non-transitory storage medium of the speakerphone being configured to execute the model. In one or more example speakerphones and/or speakerphone systems, the model may comprise model data and or computer readable instructions (for example based on the plurality of beamforming parameters, the impulse responses, internal output signal, and/or microphone input signal(s), such as historical beamforming parameter data and/or impulse response data). The model data and/or the computer readable instructions may be used by the speakerphone. The model (such as model data and/or the computer readable instructions) may be used by the speakerphone to determine conference parameters, such as the first conference parameter. In other words, the model (such as model data and/or the computer readable instructions) may be used by the speakerphone to determine one or more conference parameters, parameters as described herein, such as conference configuration parameters. In one or more example speakerphones, the machine learning model may be used to determine one or more parameters as described herein, such as the first conference parameter being a number of participants, a second conference parameter being a position of a speaker in the conference, a third conference parameter being a size of an environment of the conference, a fourth conference parameter being indicative of turn taking information, and/or a fifth conference parameter being a level of absorption in the conference.

In one or more example speakerphones, the machine learning circuitry comprises a neural network module configured to operate according to a neural network.

The machine learning model may be based on a neural network (such as a convolutional neural network, a deep learning neural network, a recurrent neural network, and/or a combined learning circuitry). The machine learning circuitry may be configured to determine (and optionally identify) one or more patterns in existing data (beamforming parameter data, impulse response data, internal output signal data, microphone input signal data, and/or conference parameters) in order to facilitate making determinations and/or predictions for subsequent conference parameters. For example, the machine learning circuitry may be configured to determine (such as recognize) a conference parameter based on beamforming parameters, an impulse response and/or internal output signal data, microphone input signal data over time.

The machine learning circuitry (such as the neural network module and/or the regressor module) may be configured to operate according to a machine learning scheme configured to determine a rule or a pattern or a relation that maps inputs to outputs, so that when subsequent novel inputs are provided the machine learning circuitry may, based upon the rule, pattern or relation, accurately predict the correct output. In one or more embodiments, the machine learning model may first extract one or more features from input beamforming parameters and/or impulse response data, such as by using signal processing methods (such as filters), statistics of the signals (such as mean, max, median, and/or quantile), and/or results from unsupervised learning methods (such as dimension reduction methods, clustering, and/or auto-encoder). The one or more features may then be fed into a regression and/or classification model that is trained using machine learning techniques.

In one or more example speakerphones, the speakerphone is configured to process, such as using the processor and based on the first conference parameter, the microphone input signal for provision of an external output signal. The external output signal may be indicative of an audio signal generated by user(s) at the near-end, such as in the conference. In other words, the external output signal may be indicative of speech from the near-end. The external output signal may be seen as the output of the speakerphone from the near-end to the far-end, based on the microphone input signal.

In one or more example speakerphones, the speakerphone is configured to control, such as using the processor, the processing of a microphone input signal, such as the first plurality of microphone input signals and/or the second plurality of microphone input signals, based on the first conference parameter. In one or more example speakerphones, the processing of a microphone input signal may comprise a first processing of the microphone input signal for provision of the external output signal. The external output signal may be indicative of a noise suppressed microphone input signal, e.g., based on the first conference parameter. In other words, the first processing of the microphone input signal may comprise cancelling the noise, such as noise suppression in the microphone input signal, based on the first conference parameter. In one or more example speakerphones, the speakerphone is configured to control, such as using the processor, the processing of the microphone input signal based on one or more of the first conference parameter, a second conference parameter, a third conference parameter, a fourth conference parameter, and a fifth conference parameter.

The external output signal may be indicative of an echo suppressed microphone input signal. In other words, the first processing of the microphone input signal may comprise cancelling the echo, such as echo suppression, in the microphone input signal.

In one or more example speakerphones, the external output signal may be the output of a digital signal processing, DSP, logic. In one or more example speakerphones, the processor of the speakerphone may comprise a DSP logic.

The output signal may be indicative of noise and echo suppressed microphone input signal. In other words, the first processing of the microphone input signal may comprise cancelling the noise and the echo in the microphone input signal. In one or more example audio devices, the output signal may be based on or constituted by the output of a digital signal processing, DSP, logic.

In one or more example speakerphones, the DSP logic may comprise one or more filters to process the microphone input signals. In one or more example speakerphones, the DSP logic is configured to change one or more weights associated with the filters based on the one or more conference parameters, such as the first conference parameter. In one or more example speakerphones, the DSP logic may comprise a neural network, such as a cascading neural network, which may receive the one or more conference parameters as input. The DSP logic may process the microphone input signals based on the output being filter coefficients and/or processing scheme identifier(s) of the cascading neural network. In one or more examples, the DSP logic may be configured to select a processing scheme/filter coefficients based on the first conference parameter.

In one or more example speakerphones, the speakerphone is configured to transmit, via the interface, the external output signal. In other words, the speakerphone is configured to transmit the external output signal via the interface to the far-end. The speakerphone may transmit the external output signal via a wireless transceiver and/or a wired connector of the speakerphone. In one or more example speakerphone, the speakerphone may transmit the external output signal to an electronic device, such as another speakerphone, a mobile phone, a tablet, a computer, a smartwatch, a server, a cloud-based server, a smart speaker and/or a loudspeaker.

In one or more example speakerphones, to obtain the internal output signal comprises to obtain a far-end input signal from a far-end communication device. The far-end input signal may be indicative of speech from one or more users at the far-end. In one or more example speakerphones, the internal output signal is based on the far-end input signal.

In one or more example speakerphones, the speakerphone is configured to transmit, such as using the processor and/or via the interface, the conference configuration to the server device.

A server device is disclosed. The server device comprises one or more interfaces. The server device comprises a memory. The server device comprises one or more processors. Optionally, the server device comprises machine learning circuitry configured to operate according to a machine learning model. The description of the machine learning model of the speakerphone may also apply to the description of the machine learning model of the server device. The server device is configured to obtain, via the one or more interfaces, from a speakerphone, an impulse response associated with a conference (where the speakerphone is used), beamforming parameters, and/or one or more conference parameters indicative of acoustics of the environment (of the speakerphone). In one or more example server devices, the server device is configured to obtain, via the one or more interfaces, from a plurality of speakerphones, a plurality of impulse responses associated with a plurality of conferences, beamforming parameters associated with a plurality of beamformers, and/or a plurality of conference parameters indicative of a plurality of conference configurations. The server device is configured to update one or more beamforming parameters based on the impulse response(s) and/or the conference parameters for provision of a set of updated beamforming parameters. The server device is configured to transmit the updated beamforming parameters to a speakerphone, such as to one or more speakerphones. For example, the server device may determine a frequency of a beamformer update based on the conference parameters. It is an advantage that the server device is configured to obtain impulse responses, beamforming parameters, and/or conference parameters from a plurality of speakerphones. The server device may update beamforming parameters based on a large amount of data, while avoiding privacy and/or confidentiality issues by only obtaining impulse responses, beamforming parameters, and/or conference parameters.

In one or more example server devices, the machine learning model is an conference parameter detection model. The conference parameter detection model may be seen as a machine learning model configured to detect and/or extract one or more parameters indicative of conference parameters of a conference. In one or more example server devices, the server device is configured to update the machine learning model based on the impulse responses, beamforming parameters, and/or conference parameters. In one or more example server devices, the server device is configured to transmit the updated machine learning model to a speakerphone, such as to one or more speakerphones.

A server device may be configured on a cloud, such as a cloud network. Different operations configured to be performed by the speakerphone, the server device, and/or the system as disclosed herein may be performed at different devices, such as at the speakerphone and/or at the server device.

A method of operating a speakerphone is disclosed. The method comprises obtaining, using the speakerphone, a first plurality of microphone input signals of a conference. The method comprises determining, using the speakerphone and based on the first plurality of microphone input signals, a first plurality of beamforming parameters. The method comprises obtaining, using the speakerphone, a first internal output signal for provision of a first internal audio output signal in the conference. The method comprises outputting, using the speakerphone and based on the first internal output signal, the first internal audio output signal in the conference. The method comprises obtaining, using the speakerphone, a third microphone input signal associated with the first internal audio output signal. The method comprises obtaining, using the speakerphone, a second internal output signal for provision of a second internal audio output signal in the conference. The method comprises outputting, using the speakerphone and based on the second internal output signal, the second internal audio output signal in the conference. The method comprises obtaining, using the speakerphone, a fourth microphone input signal associated with the second internal audio output signal. The method comprises determining, using the speakerphone and based on the first internal output signal and the third microphone input signal, a first impulse response associated with the conference. The method comprises determining, using the speakerphone and based on the second internal output signal and the fourth microphone input signal, a second impulse response associated with the conference. The method comprises determining, using the speakerphone and based on the first plurality of beamforming parameters, the first impulse response, and the second impulse response, one or more conference parameters indicative of a conference configuration, the one or more conference parameters including a first conference parameter. The method comprises outputting the first conference parameter.

It is to be understood that a description of a feature in relation to the speakerphone, the server device, and/or the electronic device(s) is also applicable to the corresponding feature in the system(s), and/or the method(s) of operating a speakerphone as disclosed herein.

FIG. 1 schematically illustrates an example system, such as a speakerphone system 2 according to the present disclosure. The speakerphone system 2 may be seen as a system with beamformer-based conference characterization. The speakerphone system 2 comprises a speakerphone 10 comprising a memory 10A, an interface 10B, a processor 10C, one or more speakers 10D, and a plurality of microphones 10E. The speakerphone 10 may be seen as an audio device configured to obtain audio signals, output audio signals, and process audio signals. The speakerphone 10 may be seen as a conference speakerphone, e.g., configured to be used by a party (such as one or more users 1A at a near-end) to communicate with one or more other parties (such as one or more users 1B at a far-end). The speakerphone 10 may be seen as a smart speakerphone. The speakerphone 10 may be used for a conference and/or a meeting between two or more parties being remote from each other. The speakerphone 10 may be used by one or more users in a vicinity of where the speakerphone 10 is located, also referred to as a near-end.

Optionally, the speakerphone system 2 comprises a server device 20. The server device 20 comprises a memory 20A, an interface 20B (such as one or more interfaces), and a processor 20C (such as one or more processors). Optionally, the server device 20, such as the processor 20C, comprises machine learning circuitry 21 configured to operate according to a machine learning model. In one or more example systems, the system 2 comprises one or more speakerphones, such as a plurality of speakerphones, including speakerphone 10.

Optionally, the speakerphone system 2 comprises an electronic device 60. The electronic device 60 may for example be or comprise a mobile phone, such as a smartphone, a smart-watch, a conference hub, a smart-tv, smart-speakers, a tablet, a computer, such as a laptop computer or PC, or a tablet computer. In other words, the electronic device 60 may for example be a user device of a user 1, 1A, such as a mobile phone or a computer, configured to communicate with the speakerphone 10. In one or more example systems and/or speakerphones, the accessory device may be seen as a user accessory device, such as a mobile phone, a smart watch, a tablet, and/or a wearable gadget.

Optionally, the speakerphone system 2 comprises a far-end communication device 30. The communication device 30 may be seen as a communication device used by one or more far-end users 1, 1B to communicate with the one or more users 1, 1A at the near-end, e.g., via a network 40 such as global network, e.g. the internet, and/or a local network. The communication device 30 may be configured to obtain 38 a microphone input signal indicative of speech from one or more users 1B at the far-end. The communication device 30 may be configured to process the microphone input signal for provision of an external output signal. The communication device 30 may be configured to transmit 22 the external output signal to the speakerphone 10, e.g., via the network 40. The communication device 30 may be configured to receive 24 the external output signal from the speakerphone 10. The communication device 30 may be configured to output 36, to the user 1B at the far-end, an internal output signal based on the external output signal from the speakerphone 10.

The speakerphone 10 is configured to obtain, using the first plurality of microphones 10E, a plurality of microphone input signals of a conference, such as a first plurality of microphone input signals and/or a second plurality of microphone input signals of the conference. In one or more example speakerphones, the speakerphone 10 is configured to obtain 4, such as using the processor 10C and via the interface 10B, a plurality of microphone input signals from one or more microphones, such as the plurality of microphones 10E, e.g., comprising a first microphone, a second microphone, a third microphone, and/or a fourth microphone. In one or more example speakerphones, the plurality of microphone input signals may be a combined input signal obtained from two or more of the plurality of microphones 10E. In one or more example speakerphones, the plurality of microphone input signals may be indicative of an audio signal generated by user(s) 1A (such as one or more participants in the conference) of the speakerphone 10 in the conference. In one or more example speakerphones, the microphone input signal may be indicative of an audio signal generated by the user(s) 1A of the speakerphone 10 while using the speakerphone 10 in the conference. In other words, the plurality of microphone input signals may be indicative of user speech.

The speakerphone 10 is configured to determine, such as using the processor 10C and based on the first plurality of microphone input signals, a first plurality of beamforming parameters. In other words, the speakerphone 10 may be configured to use beamforming on microphone input signals, such as on the first plurality of microphone input signals and/or a second plurality of microphone input signals. The speakerphone 10 may be configured to, such as using the processor 10C, apply the first plurality of beamforming parameters on the first plurality of microphone input signals. For example, the speakerphone 10 may be configured to use beamforming that can be optimized for passing speech through while cancelling noise.

The speakerphone 10, such as the processor 10C, may comprise a beamformer (such as a beamforming module) configured to use and/or apply the beamforming parameters, such as apply the first plurality of beamforming parameters, on the plurality of microphone input signals.

In one or more example speakerphones, the speakerphone 10 is configured to determine, using the processor 10C and based on the second plurality of microphone input signals, a second plurality of beamforming parameters.

The speakerphone 10 is configured to obtain 14, such as using the processor 10C and via the interface 10B, an internal output signal for provision 6 of an internal audio output signal in the conference. The speakerphone 10 is configured to obtain 14, such as using the processor 10C and via the interface 10B, a first internal output signal for provision of a first internal audio output signal in the conference. In other words, the speakerphone 10 is configured to obtain 14 a first internal output signal for provision 6 of a first internal audio output signal in the environment of the conference. In one or more example speakerphones, the speakerphone 10 is configured to obtain 14 the internal output signal, such as the first internal output signal and/or a second internal output signal, from a far-end, such as a far-end party or user(s) 1B. In one or more example speakerphones, the speakerphone 10 is configured to obtain the internal output signal, such as the first internal output signal and/or a second internal output signal, from the memory 10A and/or from the server device 20. The internal output signal, such as the first internal output signal and/or a second internal output signal, may be indicative of an audio signal generated by user(s) 1B at the far-end. In other words, the internal output signal, such as the first internal output signal and/or a second internal output signal, may be indicative of speech from the far-end. In one or more example speakerphones, the internal output signal, such as the first internal output signal and/or a second internal output signal, is based on a test signal obtained from the memory 10A and/or the server device 20.

The speakerphone 10 is configured to output 6, such as using the speaker 10D and based on the internal output signal, the internal audio output signal in the conference. In other words, the speakerphone 10 may be configured to output 6, via the speaker 10D and based on the internal output signal, such as the first internal output signal and/or a second internal output signal, the internal audio output signal, such as the first internal audio output signal and/or a second internal audio output signal, in the conference. An internal audio output signal may be seen as an output of the speaker 10D at a near-end where the speakerphone 10 and the user(s) 1A of the speakerphone 10 are located. The speakerphone 10 is configured to output 6, such as using the speaker 10D and based on the first internal output signal, the first internal audio output signal in the conference. In other words, the speakerphone 10 may be configured to output, via the speaker 10D and based on the first internal output signal, the first internal audio output signal in the environment of the conference. The internal audio output signal, such as the first internal output signal and/or a second internal output signal, may be seen as an output of the speaker 10D at a near-end where the speakerphone 10 and the user(s) 1A of the speakerphone 10 are located.

The speakerphone 10 is configured to obtain 4, using the plurality of microphones 10E, a third microphone input signal associated with the first internal audio output signal. In one or more example speakerphones, the speakerphone 10 is configured to obtain 4, such as using the processor 10C and via the interface 10B, a third microphone input signal from the plurality of microphones 10E. In one or more example speakerphones, the third microphone input signal may be a combined input signal obtained from two or more of the plurality of microphones 10E. The third microphone input signal may be representative of a direct path of an internal audio output signal from the speaker 10D to a microphone, such as to the plurality of microphones 10E, a reverberation of an internal audio output signal from the speaker 10D, such as a reverberation in the environment of the conference of an internal audio output signal outputted from the speaker 10D, and/or a user impulse response, such as direct path and/or reverberation of an audio signal outputted from the user 1A. In one or more example speakerphones, the third microphone input signal may be indicative of an audio signal generated by user(s) 1A of the speakerphone 10 in the environment. In one or more example speakerphones, the third microphone input signal may be indicative of an audio signal generated by the user(s) 1A of the speakerphone 10 while using the speakerphone 10. In other words, the third microphone input signal may be indicative of user speech.

The speakerphone 10 is configured to obtain, such as using the processor 10C and via the interface 10B, a second internal output signal for provision of a second internal audio output signal in the conference. In one or more example speakerphones, the speakerphone 10 is configured to obtain 14 the second internal output signal from a far-end, such as a far-end party or user(s) 1B, e.g., from the communication device 30. In one or more example speakerphones, the speakerphone 10 is configured to obtain 14, 18 the second internal output signal from the memory 10A and/or from the server device 20. The second internal output signal may be indicative of an audio signal generated by user(s) 1B at the far-end. In other words, the internal output signal may be indicative of speech from the far-end. In one or more example speakerphones, the internal output signal is based on a test signal obtained from the memory 10A and/or the server device 20.

The speakerphone 10 is configured to output 6, such as using the speaker 10D and based on the second internal output signal, the second internal audio output signal in the conference.

The speakerphone 10 is configured to obtain 4, using the plurality of microphones 10E, a fourth microphone input signal associated with the second internal audio output signal.

In one or more example speakerphones, the third microphone input signal is obtained at a third time and the fourth microphone input signal is obtained at a fourth time, and wherein the fourth time is after the third time.

The speakerphone 10 is configured to determine, using the processor 10C and based on the first internal output signal and the third microphone input signal, a first impulse response associated with the conference. The first impulse response may be seen as an acoustic impulse response. The first impulse response may be seen as an impulse response between the speaker 10D, e.g., being an excitation source, of the speakerphone 10D and the plurality of microphones 10E of the speakerphone. The first impulse response may be influenced by the speakerphone 10 itself and the environment of the conference, such as room, where the speakerphone 10 is located. It may be appreciated that the first impulse response reflects one or more acoustic paths from the speaker to the microphone(s), such as first microphone 10E.

The speakerphone 10 is configured to determine, using the processor 10C and based on the second internal output signal and the fourth microphone input signal, a second impulse response associated with the conference.

The speakerphone 10 is configured to determine, such as using the processor 10C and based on the first plurality of beamforming parameters, the first impulse response, and the second impulse response, one or more conference parameters indicative of a conference configuration. In one or more example speakerphones, the one or more conference parameters include a first conference parameter. In other words, the speakerphone 10 may be configured to determine, such as using the processor 10C and based on the first plurality of beamforming parameters, the first impulse response, and the second impulse response, a first conference parameter.

In one or more example speakerphones, the speakerphone 10 is configured to transmit 13, via the interface 10B, the impulse response(s), the beamforming parameter(s), and/or the first conference parameter to the server device 20. The server device 20 may be configured to receive 16, via the interface 20B, the impulse response(s), the beamforming parameter(s), and/or the first conference parameter.

In one or more example speakerphones, the speakerphone 10 is configured to output the first conference parameter. In one or more example speakerphones, the speakerphone 10 is configured to output 6, 13 such as via the speaker 10D and/or the interface 10B and using the processor 10C, the first conference parameter. In one or more example speakerphones, the speakerphone 10 is configured to output the first conference parameter to the memory 10A, such as to store the first conference parameter in a part of the memory 10A. In one or more example speakerphones, the speakerphone 10 is configured to output 13, via the interface 10B, the first conference parameter to the server device 20, e.g., via the electronic device 60 as disclosed herein and/or via the network 40, e.g., a global network such as the internet and/or a local network. For example, the speakerphone 10 may be configured to output the first conference parameter to an IT department in charge of the conference configuration in the environment of the conference. In one or more example speakerphones, to output the first conference parameter comprises to output 6, e.g., to the user 1A and via the speaker 10D of the speakerphone 10, an audio signal representing the first conference parameter.

In one or more example speakerphones, to output the first conference parameter comprises to display, e.g., via an interface of the electronic device 60 as disclosed herein, a user interface representing the first conference parameter. In one or more example speakerphones, the speakerphone 10 may comprise a display (not shown), and to output the first conference parameter comprises to display 6, e.g., via the display of the speakerphone 10, a user interface representing the first conference parameter.

In one or more example speakerphones, the processor 10C comprises machine learning circuitry (such as machine learning circuitry 70 of FIG. 2) configured to operate according to a machine learning model. In one or more example speakerphones, to determine the one or more conference parameters comprises to determine the one or more conference parameters, based on the first plurality of beamforming parameters, the first impulse response, and the second impulse response, using the machine learning model.

In one or more example speakerphones, the speakerphone 10 is configured to process, such as using the processor 10C, a microphone input signal, such as the first plurality of microphone input signals and/or the second plurality of microphone input signals, for provision of an external output signal. The external output signal may be indicative of an audio signal generated by user(s) 1A at the near-end, such as in the conference. In other words, the external output signal may be indicative of speech from the near-end. The external output signal may be seen as the output 13 of the speakerphone 10 from the near-end to the far-end, based on the microphone input signal.

In one or more example speakerphones, the speakerphone 10 is configured to control, such as using the processor 10C, the processing of a microphone input signal based on the first conference parameter.

In one or more example speakerphones, the speakerphone 10 is configured to transmit 13, via the interface 10B, the external output signal, e.g., to the communication device 30 via the network 40.

In one or more example speakerphones, to obtain the internal output signal, such as the first internal output signal and/or the second internal output signal, comprises to obtain 14, 22 a far-end input signal from a far-end communication device 30. The far-end input signal may be indicative of speech from one or more users 1B at the far-end. In one or more example speakerphones, the internal output signal, such as the first internal output signal and/or the second internal output signal, is based on the far-end input signal.

In one or more example server devices, the server device 20 is configured to obtain 16, via the one or more interfaces 20B, from a speakerphone, such as speakerphone 10, an impulse response associated with an environment of the conference of the speakerphone, one or more beamforming parameters associated with one or more participants of the conference, and/or one or more conference parameters indicative of a conference configuration. In one or more example server devices, the server device 20 is configured to obtain 16, via the one or more interfaces 20B, from a plurality of speakerphones, a plurality of impulse responses associated with a plurality of conferences, a plurality of beamforming parameters associated with a plurality of participants from different conferences, and/or a plurality of conference parameters indicative of a plurality of conference configurations. The server device 20 may be configured to train the machine learning model based on the impulse response(s), the beamforming parameter(s), and/or the conference parameters for provision of an updated machine learning model. The server device 20 may be configured to update one or more settings of a beamformer based on the impulse response(s), the beamforming parameter(s), and/or the conference parameters for provision of updated settings for a beamformer. The server device 20 is configured to transmit 18 the updated machine learning model and/or the updated beamformer settings to a speakerphone, such as to speakerphone 10.

Figure 2:
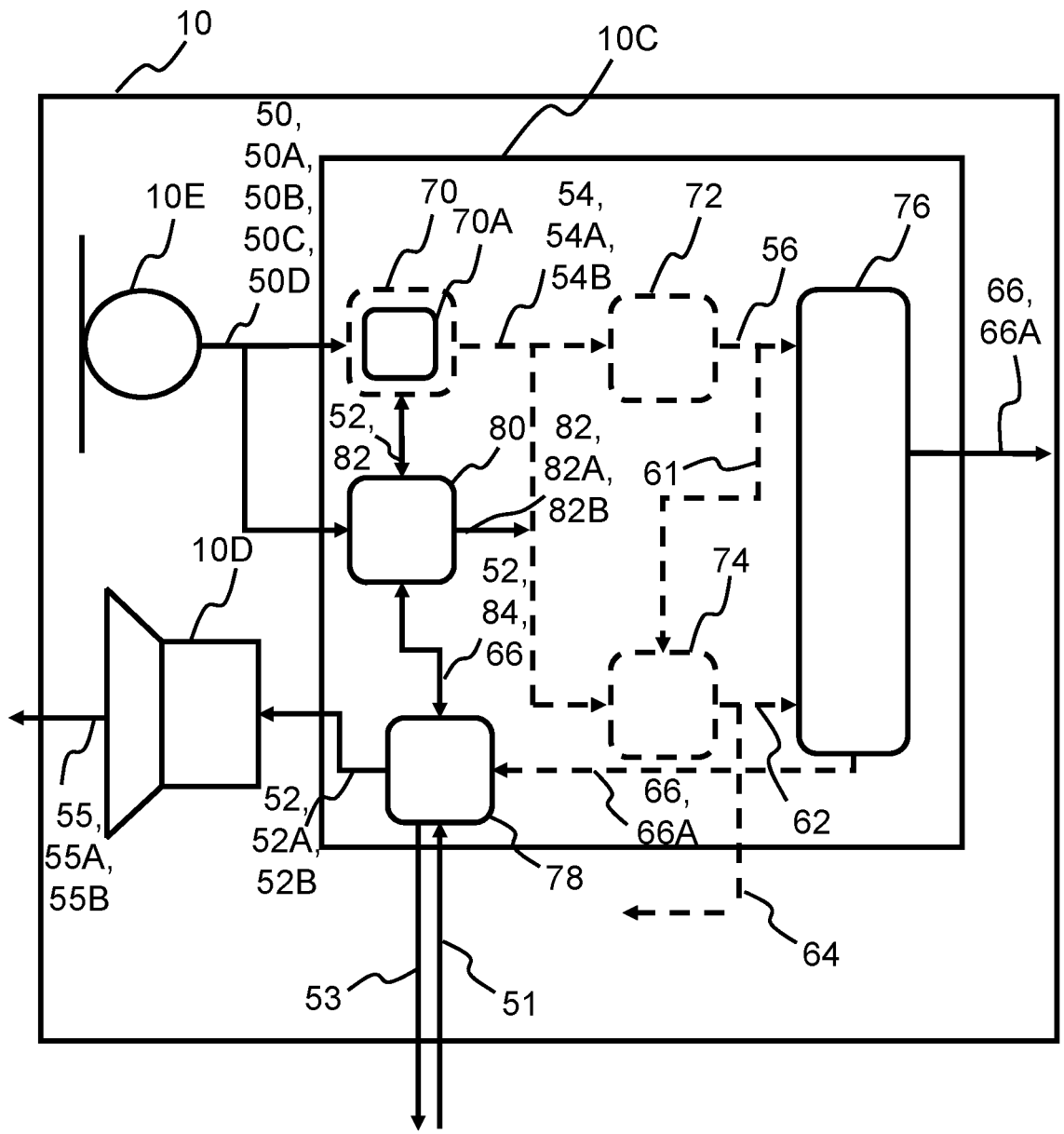
Figure 3:
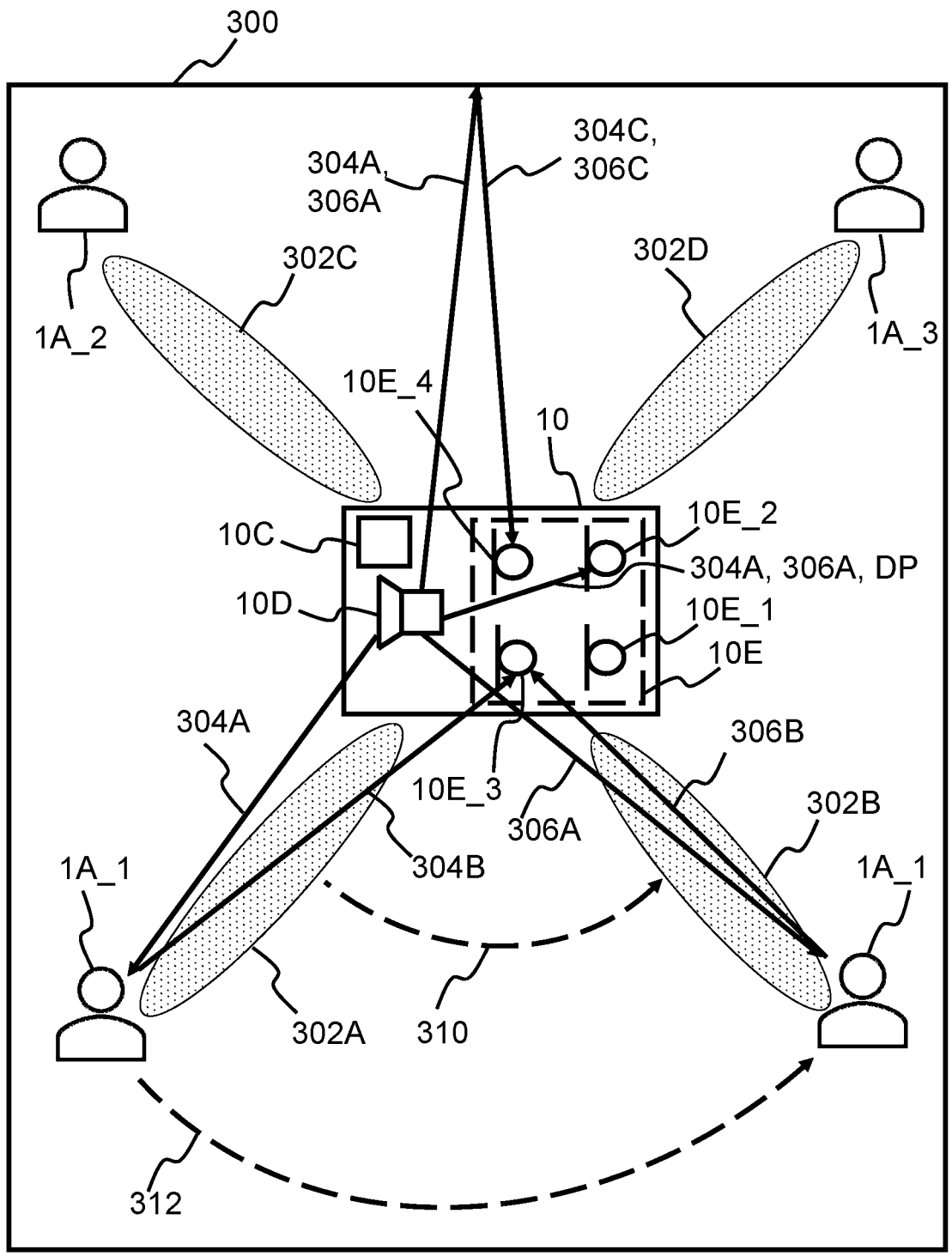
Figure 4A:
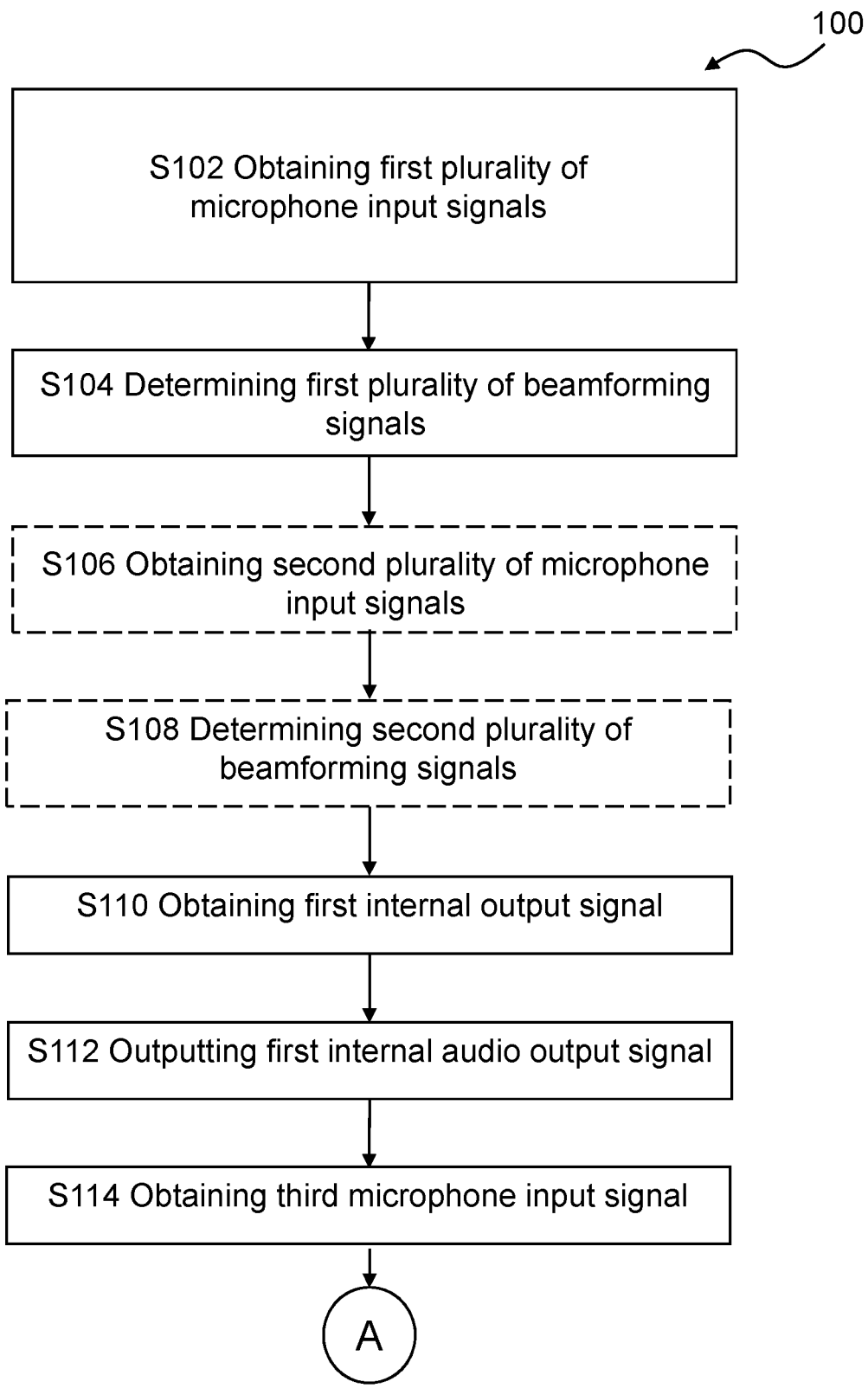
FIGS. 4A-4E is a flow chart of an example method according to the present disclosure.
Figure 4B:
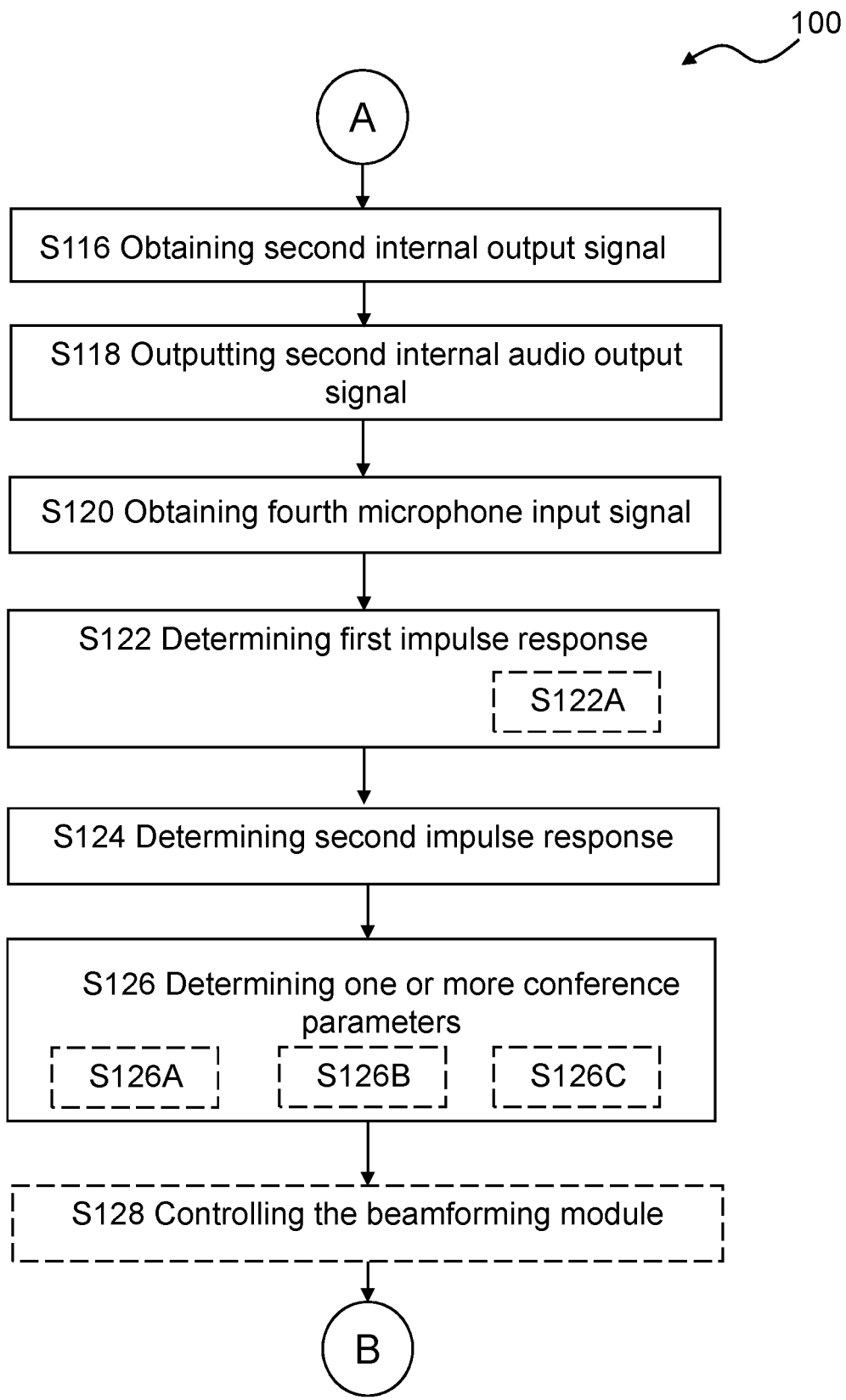
Figure 4C:
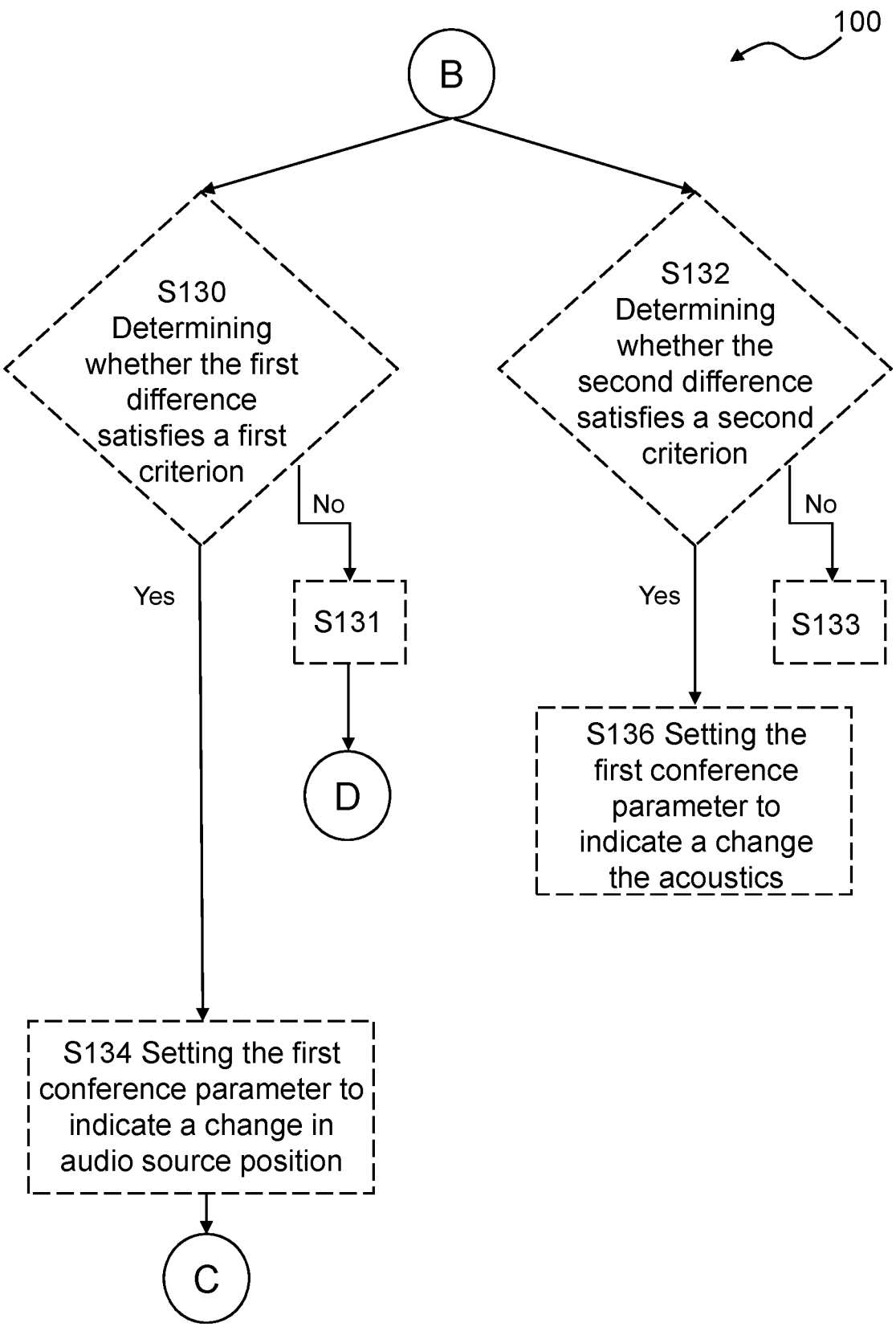
Figure 4D:
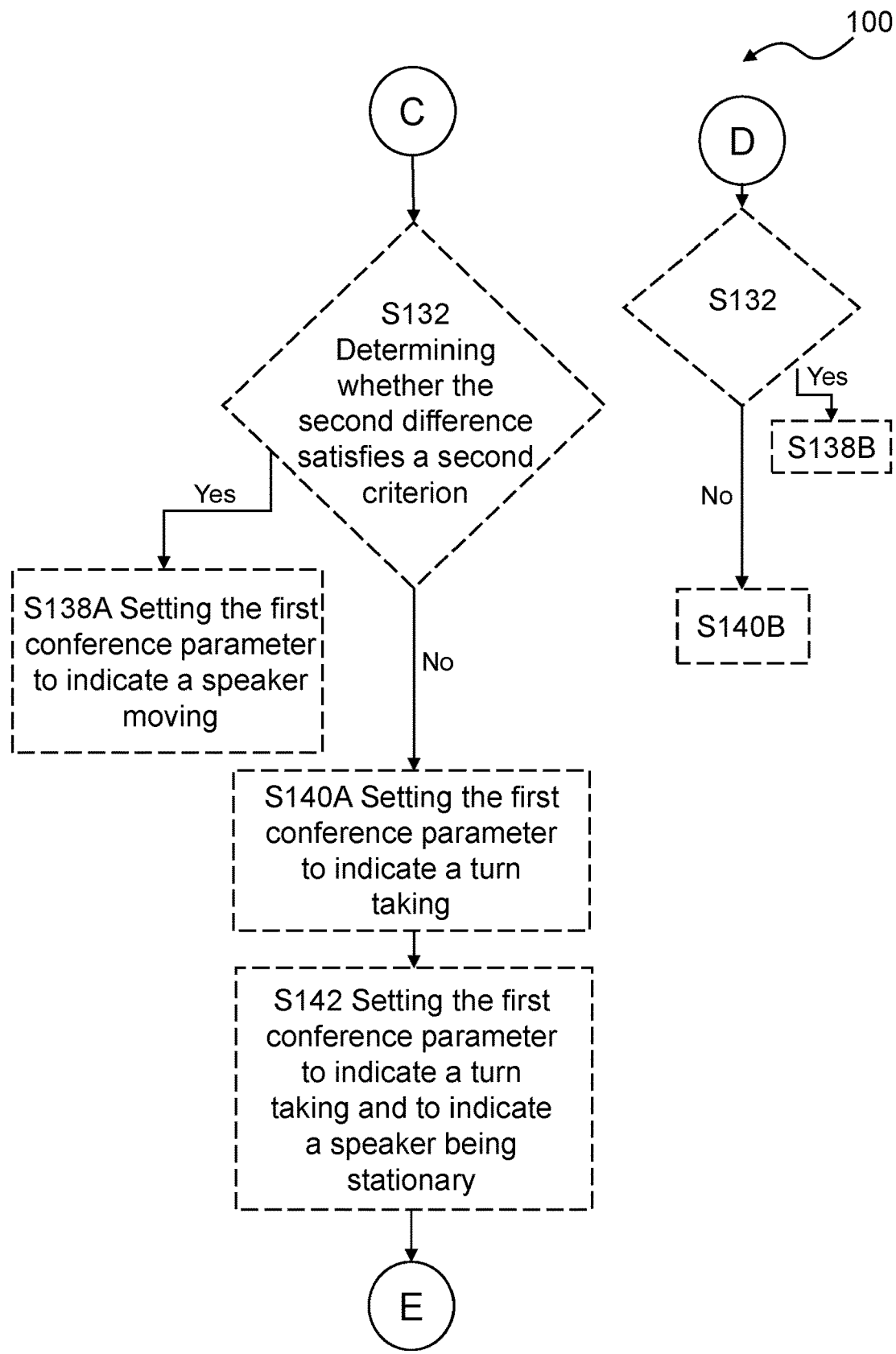
Figure 4E:
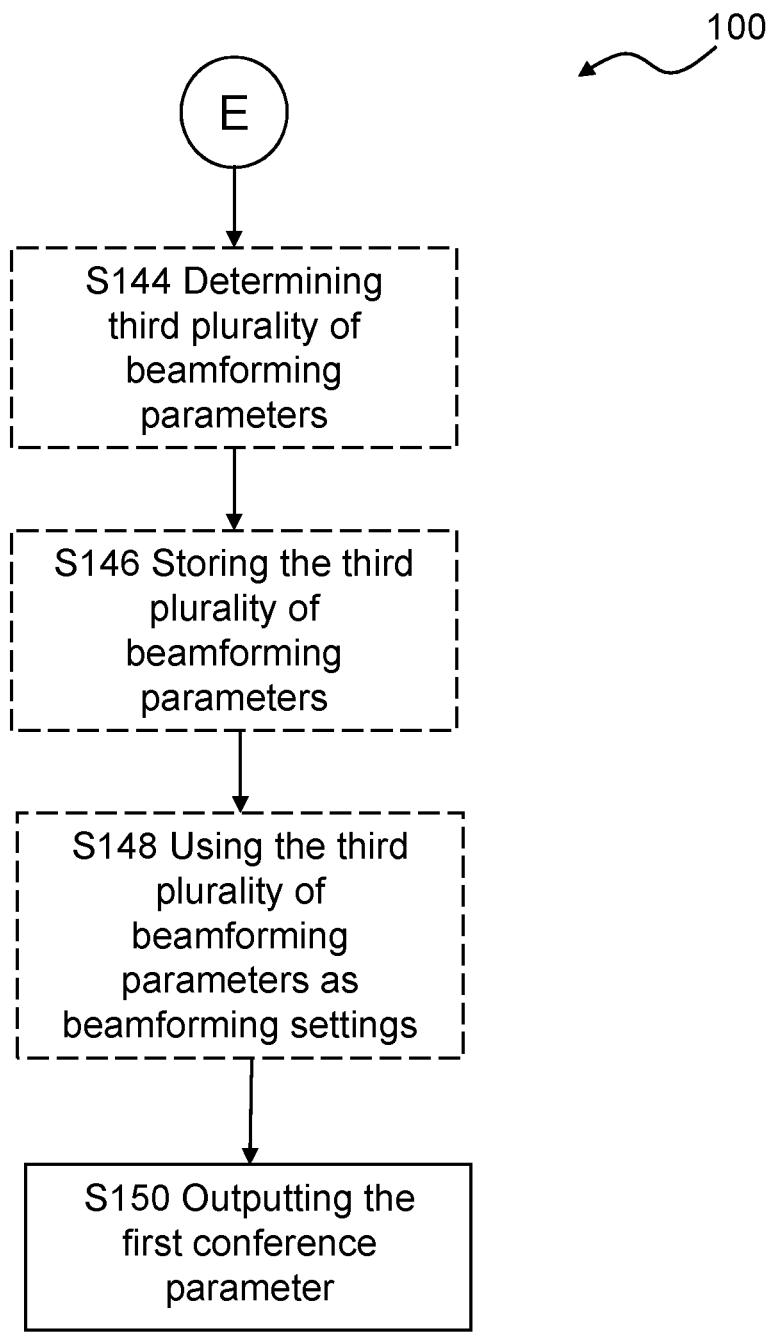

FIG. 2 schematically illustrates a speakerphone, such as a speakerphone 10 according to the present disclosure (such as the speakerphone 10 disclosed in FIG. 1 and/or FIG. 3). The speakerphone 10 comprises a processor 10C, a speaker 10D, and a plurality of microphones 10E. In one or more example speakerphones, the processor 10C comprises a far-end processor 78 configured to obtain a far-end signal 51, such as an audio signal, from a far-end. The far-end processor 78 may be configured to obtain and/or to process audio signals from the far-end. The far-end processor 78 may be configured to obtain and/or to process the far-end signal 51 for provision of an internal output signal 52, e.g., to the speaker 10D, the beamforming module 80, and/or to the impulse response determiner 70A.

The far-end processor 78 may be configured to obtain and/or to process the microphone input signal 50 for provision of an external output signal 53, e.g., to the far-end. The far-end processor 78 may be configured to output the internal output signal 52 to the speaker 10D for provision of an internal audio output signal 55. The speakerphone 10 is configured to output, using the speaker 10D and based on the internal output signal, the internal audio output signal 55 in the environment.

In one or more example speakerphones, the processor 10C comprises a beamforming module 80 configured to operate according to beamforming settings. The beamforming settings may comprise beamforming parameters. The beamforming module 80 may be seen as and/or denoted a beamformer. In one or more example speakerphones, the speakerphone 10 is configured to control, based one or more conference parameters, such as conference parameters 66, the beamforming module 80. In one or more example speakerphones, the speakerphone 10 is configured to control, based on the first conference parameter 66A, the beamforming module 80. In other words, the speakerphone 10, such using the processor 10C, may be configured to determine beamforming parameters 82 based on one or more conference parameters 66, such as the first conference parameter 66A. For example, the speakerphone 10 may be configured to control, such as using the processor 10C, an updating frequency of the beamforming settings and/or parameters, based on the first conference parameter 66A. In other words, the speakerphone 10 may be configured to decrease or increase an updating frequency of the beamforming module 80, such as decrease or increase an updating frequency of the beamforming settings that the beamforming module 80 is configured to operate according to.

The speakerphone 10 is configured to obtain, using the first plurality of microphones 10E, a plurality of microphone input signals 50 of a conference, such as a first plurality of microphone input signals 50A and/or a second plurality of microphone input signals 50B of the conference.

The speakerphone 10 is configured to determine, such as using the processor 10C and based on the first plurality of microphone input signals 50A, a first plurality of beamforming parameters 82A. In other words, words, the speakerphone 10 is configured to determine, such as using the beamforming module 80 and based on the first plurality of microphone input signals 50A, a first plurality of beamforming parameters 82A.

In other words, the speakerphone 10, such as the beamforming module 80, may be configured to use beamforming on microphone input signals 50, such as on the first plurality of microphone input signals 50A and/or a second plurality of microphone input signals 50B. The speakerphone 10 may be configured to, such as using the processor 100 and the beamforming module 80, apply the first plurality of beamforming parameters 82A on the first plurality of microphone input signals 50A. For example, the speakerphone 10 may be configured to use beamforming that can be optimized for passing speech through while cancelling noise.

To determine a first plurality of beamforming parameters 82A may comprise to determine a first beamforming scheme, such as a first beamforming scheme to be applied to the first plurality of microphone input signals 50A. The beamforming module 80 may be configured to use and/or apply the beamforming parameters 82, such as apply the first plurality of beamforming parameters 82A, on the plurality of microphone input signals 50. The beamforming parameters 82, such as the first plurality of beamforming parameters 82A and/or a second plurality of beamforming parameters 82B, may be seen as speech beamforming parameters. In other words, the first plurality of beamforming parameters 82A may be configured or determined to increase a relative amount of speech of a main speaker, such as a user of the speakerphone 10 and/or a participant of the conference, in an external output signal 53 to the far-end. An external output signal 53 that has been beamformed may be seen as a beamforming output signal 84. The beamforming module 80 may be configured to output the beamforming output signal 84 to the far-end processor 78. In one or more example speakerphones, the far-end processor 78 and the beamforming module 80 may be comprised in a common system. The speakerphone 10 may be configured to apply, such as using the beamforming module 80, the first plurality of beamforming parameters 82A on the first plurality of microphone input signals 50A for provision of an external output signal 53 to the far-end. The external output signal 53 may be based on the beamforming output signal 84.

In one or more example speakerphones, the speakerphone 10 is configured to determine, using the processor 10C and based on the second plurality of microphone input signals 50A, a second plurality of beamforming parameters 82B.

In other words, words, the speakerphone 10 is configured to determine, such as using a beamforming module 80 and based on the first plurality of microphone input signals 50A, a first plurality of beamforming parameters 82A.

The speakerphone 10 may be configured to, such as using the processor 10C and the beamforming module 80, apply the second plurality of beamforming parameters 82B on the second plurality of microphone input signals 50B. For example, the speakerphone 10 may be configured to use beamforming that can be optimized for passing speech through while cancelling noise.

To determine a second plurality of beamforming parameters 82B may comprise to determine a second beamforming scheme, such as a second beamforming scheme to be applied to the second plurality of microphone input signals 50B. The beamforming module 80 may be configured to use and/or apply the beamforming parameters 82, such as apply the second plurality of beamforming parameters 82B, on the plurality of microphone input signals 50. In other words, the second plurality of beamforming parameters 82B may be configured or determined to increase a relative amount of speech of a main speaker, such as a user of the speakerphone 10 and/or a participant of the conference, in an external output signal 53 to the far-end. The speakerphone 10 may be configured to apply, such as using the beamforming module 80, the second plurality of beamforming parameters 82B on the second plurality of microphone input signals 50B for provision of an external output signal 53 to the far-end. The external output signal 53 may be based on the beamforming output signal 84.

The speakerphone 10 is configured to obtain, such as using the processor 10C, an internal output signal 52 for provision of an internal audio output signal 55 in the conference. The speakerphone 10 is configured to obtain, such as using the processor 10C and the far-end processor 78, a first internal output signal 52A for provision of a first internal audio output signal 55A in the conference. The far-end processor 78 may be configured to output the internal output signal 52, the first internal output signal 52A, and/or the second internal output signal 52B to the speaker 10D.

The speakerphone 10 is configured to output, such as using the speaker 10D and based on the internal output signal 52, the internal audio output signal 55 in the conference. The speakerphone 10 is configured to output, such as using the speaker 10D and based on the first internal output signal 52A, the first internal audio output signal 55A in the conference.

The speakerphone 10 is configured to obtain, using the plurality of microphones 10E, a third microphone input signal 50C associated with the first internal audio output signal 55A.

The speakerphone 10 is configured to obtain, such as using the processor 10C and via the interface, a second internal output signal 52B for provision of a second internal audio output signal 55B in the conference. The speakerphone 10 is configured to obtain, such as using the processor 10C and the far-end processor 78, a second internal output signal 52B for provision of a second internal audio output signal 55B in the conference.

The speakerphone 10 is configured to output, such as using the speaker 10D and based on the second internal output signal 52B, the second internal audio output signal 55B in the conference.

The speakerphone 10 is configured to obtain, using the plurality of microphones 10E, a fourth microphone input signal 50D associated with the second internal audio output signal 55B.

The speakerphone 10 is configured to determine, using the processor 10C and based on an internal output signal 52 and a microphone input signal 50, an impulse response 54 associated with the environment. In other words, the speakerphone 10 is configured to determine, using the processor 10C and based on the first internal output signal 52A and the third microphone input signal 50C, a first impulse response 54A associated with the conference. In one or more example speakerphones, the speakerphone 10, such as the processor 10C, comprises an impulse response determiner 70A, such as an impulse response determination module, configured to determine the first impulse response 54A, based on the first internal output signal 52A and the third microphone input signal 50C. The impulse response determiner 70A may be configured to obtain the internal output signal 52, such as the first internal output signal 52A, from the far-end processor 78.

The speakerphone 10 is configured to determine, using the processor 10C and based on the second internal output signal 52B and the fourth microphone input signal 50D, a second impulse response 54B associated with the conference. In one or more example speakerphones, the impulse response determiner 70A is configured to determine the second impulse response 54B, based on the second internal output signal 52B and the fourth microphone input signal 50D. The impulse response determiner 70A may be configured to obtain the internal output signal 52, such as the second internal output signal 52B, from the far-end processor 78.

The speakerphone 10 is configured to determine, such as using the processor 10C and based on the first plurality of beamforming parameters 82A, the first impulse response 54A, and the second impulse response 54B, one or more conference parameters 66 indicative of a conference configuration. In one or more example speakerphones, the one or more conference parameters 66 include a first conference parameter 66A. In other words, the speakerphone 10 may be configured to determine, such as using the processor 10C and based on the first plurality of beamforming parameters 82A, the first impulse response 54A, and the second impulse response 54B, a first conference parameter 66A. In one or more example speakerphones, the speakerphone 10, such as the processor 10C, comprises a conference parameter determiner 76, such as a conference parameter determination module, configured to determine a conference parameter 66, based on the first plurality of beamforming parameters 82A, the first impulse response 54A, and the second impulse response 54B, one or more conference parameters 66 indicative of a conference configuration. In one or more example speakerphones, the conference parameter determiner 76 is configured to output the conference parameter 66, such as the first conference parameter 66A, to the far-end processor 78. The far-end processor 78 may be configured to process the microphone input signal 50, such as the first plurality of microphone input signals 50A and/or the second plurality of microphone input signals 50B, based on the conference parameter 66, such as based on the first conference parameter 66A.

In one or more example speakerphones, to determine the one or more conference parameters 66 comprises to determine a first difference between the first plurality of beamforming parameters 82A and the second plurality of beamforming parameters 82B. In other words, the speakerphone 10 is configured to determine, such as using the conference parameter determiner 76, a first difference between the first plurality of beamforming parameters 82A and the second plurality of beamforming parameters 82B.

In one or more example speakerphones, the speakerphone 10 is configured to, in accordance with a determination that the first difference satisfies a first criterion, set, such as using the conference parameter determiner 76, the first conference parameter 66A to indicate a change in audio source position in the conference, such as one or more audio sources.

In one or more example speakerphones, to determine the one or more conference parameters 66 comprises to determine a second difference between the first impulse response 54A and the second impulse response 54B. In other words, the speakerphone 10 is configured to determine, such as using the conference parameter determiner 76, a second difference between the first impulse response 54A and the second impulse response 54B.

In one or more example speakerphones, the speakerphone 10 is configured to, in accordance with the second difference satisfying a second criterion, set, such as using the conference parameter determiner 76, the first conference parameter 66A to indicate a change in acoustics in the conference.

In one or more example speakerphones, the speakerphone 10 is configured to, in accordance with a determination that the first difference satisfies the first criterion and in accordance with a determination that the second difference does not satisfy the second criterion, set, such as using the processor 10C and the conference parameter determiner 76, the first conference parameter 66A to indicate a turn taking in the conference.

In one or more example speakerphones, the speakerphone 10 is configured to, in accordance with a determination that the first difference satisfies the first criterion and in accordance with a determination that the second difference does not satisfy the second criterion, set, such as using the processor 10C and the conference parameter determiner 76, the first conference parameter 66A to indicate a turn taking in the conference and to indicate a speaker being stationary in the conference.

In one or more example speakerphones, the speakerphone 10 is configured to determine, such as using the beamforming module 80, a third plurality of beamforming parameters based on the first conference parameter 66A, where the third plurality of beamforming parameters are associated with one or more participants of the conference.

In one or more example speakerphones, the speakerphone 10 is configured to store the third plurality of beamforming parameters and use the third plurality of beamforming parameters as beamforming settings for the beamforming module 80.

In one or more example speakerphones, the speakerphone 10 is configured to, in accordance with a determination that the first difference satisfies the first criterion and in accordance with a determination that the second difference satisfies the second criterion, set, such as using the processor 10C and the conference parameter determiner 76, the first conference parameter 66A to indicate a speaker moving in the conference.

In one or more example speakerphones, the processor 10C comprises an echo canceller 70, such as an echo canceller module. The echo canceller 70 may be part of the impulse response determiner 70A. In one or more example speakerphones, to determine the impulse response 54, comprises to reduce, using the echo canceller 70, one or more echo components from the microphone input signal 50, such as from the first plurality of microphone input signals 50A, the second plurality of microphone input signals 50B, the third microphone input signal 50C, and/or the fourth microphone input signal 50D.

In one or more example speakerphones, the speakerphone 10 is configured to determine, using the echo canceller 70 and based on the internal output signal 52, such as the first internal output signal 52A and/or the second internal output signal 52B, and the microphone input signal 50, such as the third microphone input signal 50C, and/or the fourth microphone input signal 50D, the impulse response 54, such as the first impulse response 54A and/or the second impulse response 54B. In one or more example speakerphones, the speakerphone 10 is configured to control, such as using the processor 10C and based on the first conference parameter 66A, the echo canceller 70.

In one or more example speakerphones, the processor 10C comprises machine learning circuitry 74 configured to operate according to a machine learning model. In one or more example speakerphones, to determine the one or more conference parameters comprises to determine one or more conference parameters 62, based on the first plurality of beamforming parameters 82A, the first impulse response 54A, and the second impulse response 54B, using the machine learning circuitry 74.

In one or more example speakerphones, the speakerphone 10 is configured to determine, such as using the processor 10C and based on the impulse response 54, such as the first impulse response 54A and/or the first second impulse response 54B, one or more conference features 56 indicative of a conference configuration. In one or more example speakerphones, the speakerphone 10, such as the processor 10C, comprises a feature extractor 72, such as a feature extractor module, configured to determine one or more conference features 56 based on the impulse response 54, such as the first impulse response 54A, the second impulse response 54B, the first beamforming parameters 82A, and/or the second beamforming parameters 82B. In one or more example speakerphones, the feature extractor 72 is configured to output 60 the one or more conference features 56 to the machine learning circuitry 74. In one or more example speakerphones, the machine learning circuitry 74 is configured to determine one or more conference parameters 62 based on the one or more conference features 56. In one or more example speakerphones, the machine learning circuitry 74 is configured to output 64 the one or more conference parameters 62, e.g., output to a server device and/or to a memory of the speakerphone 10.

FIG. 3 schematically illustrates an example scenario where the technique as disclosed herein is applied. FIG. 3 discloses a speakerphone, such as a speakerphone 10 according to the present disclosure (such as the speakerphone 10 disclosed in FIG. 1 and/or FIG. 2). The speakerphone 10 comprises a processor 10C, a speaker 10D, and a plurality of microphones 10E, such as a first microphone 10E_1, a second microphone 10E_2, a third microphone 10E_3, and/or a fourth microphone 10E_4. FIG. 3 illustrates a conference 300, such as a conference performed in a meeting room, comprising three participants, a first participant 1A_1, a second participant 1B_2, and a third participant 1A_3 where the speakerphone 10 is used.

The speakerphone 10 is configured to obtain, using the plurality of microphones 10E, a plurality of microphone input signals of a conference 300, such as a first plurality of microphone input signals and/or a second plurality of microphone input signals of the conference. In one or more example speakerphones, the speakerphone 10 is configured to obtain a plurality microphone input signals of a conference, such as a first plurality of microphone input signals and/or a second plurality of microphone input signals, from the plurality of microphones 10E, such as a first microphone 10E_1, a second microphone 10E_2, a third microphone 10E_3 and/or a fourth microphone 10E_4. In one or more example speakerphones, the plurality of microphone input signals may be combined input signals obtained from two or more of the first microphone 10E_1, the second microphone 10E_2, the third microphone 10E_3, and the fourth microphone 10E_4. For example, the speakerphone 10 may be configured to obtain a first primary microphone input signal using the first microphone 10E_1, a first secondary microphone input signal using the second microphone 10E_2, and/or a first tertiary microphone input signal using the third microphone 10E_3. The first primary microphone input signal, the first secondary microphone input signal, and/or the first tertiary microphone input signal may be combined and be seen as the first plurality of microphone input signals.

The plurality of microphone input signals, such as a first plurality of microphone input signals and/or a second plurality of microphone input signals, may be representative of a reverberation of an audio output signal from a speaker (such as from one or more speakers and/or participants), such as a reverberation in the environment of the conference. The plurality of microphone input signals may be representative of a user impulse response, such as direct path and/or reverberation of an audio signal outputted from a user, such as from a participant of the conference.

In one or more example speakerphones, a microphone input signal may be indicative of an audio signal generated by user(s), such as the first participant 1A_1, the second participant 1B_2, and/or the third participant 1A_3, of the speakerphone 10 in the conference 300. In other words, the first participant 1A_1, the second participant 1B_2, and/or the third participant 1A_3 may be seen as speakers. The first participant 1A_1, the second participant 1B_2, and/or the third participant 1A_3 may take turns at speaking in the conference 300 or may speak at the same time. In one or more example speakerphones, a microphone input signal may be indicative of an audio signal generated by the user(s) of the speakerphone 10 while using the speakerphone 10 in the conference 300. In other words, a microphone input signal may be indicative of user speech. In one or more example speakerphones, a microphone input signal may comprise one or more of the user's speech, such as a user speech in a near-field, interfering speech, such as a jamming speech from one or more speakers in the far-field, echo, noise, such as ambient noise, continuous noise, intermittent noise, impulsive noise, and/or low-frequency noise, and/or echo of one or more of the user's speech, and interfering speech.

The conference 300 may be seen as conference, such as a meeting, between two or more parties being located remotely from each other. In other words, the speakerphone 10 may be seen as a conference speakerphone, e.g., configured to be used by a party (such as one or more users and/or participants at a near-end) to communicate with one or more other parties (such as one or more users and/or participants at a far-end). The speakerphone 10 may be used for a conference and/or a meeting between two or more parties being remote from each other. The conference 300 may be seen as the room, such as meeting room, where the speakerphone 10 is located, such as at the near-end. The speakerphone 10 may be used by one or more users, such as the first participant 1A_1, the second participant 1B_2, and/or the third participant 1A_3, in a vicinity of where the speakerphone 10 is located, also referred to as a near-end and/or the conference 300. The conference 300 may comprise a conference configuration and/or a conference setup. The conference configuration 300 and/or setup may change and/or evolve in time. A conference setup and/or conference configuration may be seen as a physical setup of the environment where the speakerphone 10 is located. In other words, the conference setup may be indicative of a setup of different elements in the environment where the speakerphone 10 is located. For example, a conference setup and/or conference configuration may be indicative of a setup of building elements located in the environment of the speakerphone 10, such as a number of walls, a material of a wall surface, a material of a ceiling surface, a material of a floor surface, a number of doors, a material of a door, and/or a number of windows. For example, a conference setup and/or conference configuration may be indicative of a setup of objects located in the environment of the speakerphone 10, such as a number, a material, and/or a position of chairs, a number, a material, and/or a position of tables, a number, a material, and/or a position of lamps, and/or a number, a material, and/or a position of carpets. For example, a conference setup and/or conference configuration may be indicative of a setup of persons (such as users and/or participants) located in the environment of the speakerphone 10, such as a number and/or a position of persons in the conference 300. The conference setup and/or conference configuration may be associated with one or more acoustic characteristics. For example, the acoustic characteristics of the conference setup may vary depending on the conference setup and/or conference configuration in the environment. In other words, the acoustic characteristics of the conference setup and/or conference configuration may vary depending on an arrangement of one or more elements present in the environment.

The speakerphone 10 is configured to determine, such as using the processor 10C and based on the first plurality of microphone input signals, a first plurality of beamforming parameters. In other words, the speakerphone 10 may be configured to use beamforming on microphone input signals, such as on the first plurality of microphone input signals and/or a second plurality of microphone input signals. The speakerphone 10 may be configured to, such as using the processor 10C, apply the first plurality of beamforming parameters on the first plurality of microphone input signals. For example, the speakerphone 10C may be configured to use beamforming that can be optimized for passing speech through while cancelling noise.

To determine a first plurality of beamforming parameters may comprise to determine a first beamforming scheme, such as a first beamforming scheme to be applied to the first plurality of microphone input signals. The speakerphone, such as the processor, may comprise a beamformer (such as beamforming module 80 of FIG. 2) configured to use and/or apply the beamforming parameters, such as apply the first plurality of beamforming parameters, on the plurality of microphone input signals. The beamforming parameters, such as the first plurality of beamforming parameters and/or a second plurality of beamforming parameters, may be seen as speech beamforming parameters. In other words, the first plurality of beamforming parameters may be configured or determined to increase a relative amount of speech of a main speaker, such as a user of the speakerphone 10 and/or a participant of the conference, in an external output signal to the far-end. An external output signal that has been beamformed may be seen as a beamforming output signal. The speakerphone 10 may be configured to apply the first plurality of beamforming parameters on the first plurality of microphone input signals for provision of an external output signal to the far-end. A beamforming parameter may be seen as a weight of the beamformer, such as a weight to be applied by the beamformer. The first plurality of beamforming parameters may comprise one or more weights. The first plurality of beamforming parameters may be indicative of one or more beamforming lobes and/or beams. The number of beamforming lobes and/or beams may depend on the number of participants to the conference 300. A beamforming lobe or beamforming beam may have an orientation (such as a direction), and/or a width. In FIG. 3, the conference comprises three participants, the first participant 1A_1, the second participant 1B_2, and the third participant 1A_3. As illustrated, the speakerphone 10 has determined a beamforming lobe for each participant: a first primary lobe 302A for a first position of the first participant 1A_1, a second lobe 302C for the second participant 1A_2 (such as for a position of the second participant 1A_2), and a third lobe 302D for the third participant 1A_3 (such as for a position of the third participant 1A_3). The speakerphone 10 may have determined the beamforming lobes for the participants of the conference 300 based on the first plurality of microphone input signals associated with the audio signals outputted by the first participant 1A_1, the second participant 1B_2, and/or the third participant 1A_3 at a first time (such as in a first time interval).

In other words, example speakerphones, the speakerphone 10 is configured to determine, using the processor 10C and based on the second plurality of microphone input signals, a second plurality of beamforming parameters. In one or more example speakerphones, to determine the one or more conference parameters is based on the second plurality of beamforming parameters. The second plurality of beamforming parameters may be seen as updated beamforming parameters based on the second plurality of microphone input signals. In other words, words, the second plurality of beamforming parameters may be seen as updated beamforming parameters in view of the first plurality of beamforming parameters. In FIG. 3, the first participant 1A_1 has changed position 312 from a first position in the conference 300 to a second position in the conference 300. As illustrated, the speakerphone 10 has determined an updated beamforming lobe for the first participant 1A_1, namely a first secondary lobe 302B for a second position of the first participant 1A_1. The second lobe 302C for the second participant 1A_2 remains the same since the second participant 1A_2 has not changed position, and the third lobe 302D for the third participant 1A_3 remains the same since the third participant 1A_3 has not changed position. The speakerphone 10 may have determined the beamforming lobes for the participants of the conference 300 based on the second plurality of microphone input signals associated with the audio signals outputted by the first participant 1A_1, the second participant 1B_2, and/or the third participant 1A_3 at a second time. As may be seen on FIG. 3, the first primary beamforming lobe 302A has changed orientation 310 to become a first secondary lobe 302B.

In one or more example speakerphones, the first plurality of microphone input signals are obtained at a first time and the second plurality of microphone input signals are obtained at a second time. In one or more example speakerphones, the second time is after the first time. In other words, the speakerphone 10 may be configured to obtain the second plurality of microphone input signals after the first plurality of microphone input signals. In other words, the speakerphone 10 may be configured to determine the second plurality of beamforming parameters after the first plurality of beamforming parameters. It may be appreciated that, the second plurality of microphone input signals have been obtained later in time than the first plurality of microphone input signals. For example, the audio signal(s), such as second audio signal(s), that the second plurality of microphone input signals are based on, have been outputted by one or more audio sources after the audio signal(s), such as first audio signal(s), that the first plurality of microphone input signals are based on. In other words, the first participant 1A_1, the second participant 1B_2, and/or the third participant 1A_3 have outputted the second audio signal(s) that the second plurality of microphone input signals are based on after the audio signal(s) that the first plurality of microphone input signals are based on.

The speakerphone 10 is configured to obtain, such as using the processor 10C and via the interface, an internal output signal for provision of an internal audio output signal in the conference. The speakerphone 10 is configured to obtain, such as using the processor 10C and via the interface, a first internal output signal for provision of a first internal audio output signal 304A in the conference 300. In other words, the speakerphone 10 is configured to obtain a first internal output signal for provision of a first internal audio output signal 304A in the environment of the conference 300. In one or more example speakerphones, the speakerphone 10 is configured to obtain the internal output signal, such as the first internal output signal and/or a second internal output signal, from a far-end, such as a far-end party or user(s). The internal output signal, such as the first internal output signal and/or a second internal output signal, may be indicative of an audio signal generated by user(s) at the far-end. In other words, the internal output signal, such as the first internal output signal and/or a second internal output signal, may be indicative of speech from the far-end.

The speakerphone 10 is configured to output, such as using the speaker 10D and based on the internal output signal, the internal audio output signal in the conference. The speakerphone 10 is configured to output, such as using the speaker 10D and based on the first internal output signal, the first internal audio output signal 304A in the conference 300. In other words, the speakerphone 10 may be configured to output, via the speaker 10D and based on the first internal output signal, the first internal audio output signal 304A in the environment of the conference 300. The internal audio output signal, such as the first internal audio output signal 304A and/or a second internal audio output signal, may be seen as an output of the speaker 10D at a near-end where the speakerphone 10 and the user(s) of the speakerphone 10 are located.

The speakerphone 10 is configured to obtain, using the plurality of microphones 10E, a third microphone input signal associated with the first internal audio output signal 304A. In one or more example speakerphones, the speakerphone 10 is configured to obtain, such as using the processor 10C and via the plurality of microphones 10E, a third microphone input signal from one or more microphones, such as a first microphone 10E_1, a second microphone 10E_2, a third microphone 10E_3 and/or a fourth microphone 10E_4. In one or more example speakerphones, the third microphone input signal may be a combined input signal obtained from two or more of the first microphone 10E_1, the second microphone 10E_2, the third microphone 10E_3, and the fourth microphone 10E_4. The third microphone input signal may be seen as the resulting signal(s) after the first internal audio output signal 304A was outputted by the speaker 10D in the conference 300, such as in the environment of the conference 300. In other words, the third microphone input signal may be seen as a reaction of the conference, such as a reaction of the environment of the conference 300, to the first internal audio output signal 304A that was outputted. The third microphone input signal may be representative of a direct path DP of the first internal audio output signal 304A from the speaker 10D to a microphone, such as the plurality of microphones 10E, a reverberation of the first internal audio output signal 304A from the speaker 10D, such as a reverberation in the environment of the first internal audio output signal 304A outputted from the speaker 10D, and/or a user impulse response, such as a reverberation of an internal audio output signal outputted on a user. As illustrated in FIG. 3, the third microphone input signal comprises a first component being a direct path DP of the first internal audio output signal 304A from the speaker 10D to the plurality of microphones 10E. The third microphone input signal may comprise a second component being a first primary reverberation 304B of the first internal audio output signal 304A on the first participant 1A_1 being positioned at a first position in the conference 300 to the plurality of microphones 10E. The third microphone input signal may comprise a third component being a first secondary reverberation 304C of the first internal audio output signal 304A on a wall of the conference 300 to the plurality of microphones 10E.

The speakerphone 10 is configured to obtain, such as using the processor and via the interface, an internal output signal for provision of an internal audio output signal in the conference. The speakerphone 10 is configured to obtain, such as using the processor 10C and via the interface, a second internal output signal for provision of a second internal audio output signal 306A in the conference 300. In other words, the speakerphone 10 is configured to obtain a second internal output signal for provision of a second internal audio output signal 306A in the environment of the conference 300.

The speakerphone 10 is configured to output, such as using the speaker 10D and based on the internal output signal, the internal audio output signal in the conference 300. The speakerphone 10 is configured to output, such as using the speaker 10D and based on the second internal output signal, the second internal audio output signal 306A in the conference 300. In other words, the speakerphone 10 may be configured to output, via the speaker 10D and based on the second internal output signal, the second internal audio output signal 306A in the environment of the conference 300.

The speakerphone 10 is configured to obtain, using the plurality of microphones 10E, a fourth microphone input signal associated with the second internal audio output signal 306A. In one or more example speakerphones, the speakerphone 10 is configured to obtain, such as using the processor 10C and via the plurality of microphones 10E, a fourth microphone input signal from one or more microphones, such as a first microphone 10E_1, a second microphone 10E_2, a third microphone 10E_3 and/or a fourth microphone 10E_4. In one or more example speakerphones, the fourth microphone input signal may be a combined input signal obtained from two or more of the first microphone 10E_1, the second microphone 10E_2, the third microphone 10E_3, and the fourth microphone 10E_4. The fourth microphone input signal may be seen as the resulting signal(s) after the second internal audio output signal 306A was outputted by the speaker 10D in the conference 300, such as in the environment of the conference 300. In other words, the fourth microphone input signal may be seen as a reaction of the conference 300, such as a reaction of the environment of the conference 300, to the second internal audio output signal 306A that was outputted. The fourth microphone input signal may be representative of a direct path DP of the second internal audio output signal 306A from the speaker 10D to a microphone, such as the plurality of microphones 10E, a reverberation of the second internal audio output signal 306A from the speaker 10D, such as a reverberation in the environment of the second internal audio output signal 306A outputted from the speaker 10D, and/or a user impulse response, such as a reverberation of an internal audio output signal outputted on a user. As illustrated in FIG. 3, the fourth microphone input signal comprises a first component being a direct path DP of the second internal audio output signal 306A from the speaker 10D to the plurality of microphones 10E. The fourth microphone input signal may comprise a second component being a second primary reverberation 306B of the second internal audio output signal 306A on the first participant 1A_1 being positioned at a second position in the conference 300 to the plurality of microphones 10E. The fourth microphone input signal may comprise a third component being a second secondary reverberation 306C of the second internal audio output signal 306A on a wall of the conference 300 to the plurality of microphones 10E.

In one or more example speakerphones, the third microphone input signal is obtained at a third time and the fourth microphone input signal is obtained at a fourth time, and wherein the fourth time is after the third time. In other words, the fourth microphone input signal is obtained later in time than the third microphone input signal. For example, the obtaining of the fourth microphone input signal may occur later in time than the obtaining of the third microphone input signal. As may be seen in FIG. 3, the first participant 1A_1 has moved between the third time and the fourth time. The second internal audio output signal 306A is therefore reverbed differently than the first internal audio output signal 304A by the first participant 1A_1 since the first participant 1A_1 has changed position.

The speakerphone 10 is configured to determine, using the processor 10C and based on the first internal output signal and the third microphone input signal, a first impulse response associated with the conference 300. The first impulse response may be seen as an acoustic impulse response. The first impulse response may be seen as an impulse response between the speaker 10D, e.g., being an excitation source, of the speakerphone 10 and the microphone(s) 10E of the speakerphone 10, such as the first microphone 10E_1 and/or the second microphone 10E_2. The first impulse response may be influenced by the speakerphone 10 itself and the conference, such as the environment of the conference, e.g., the room, where the speakerphone 10 is located. It may be appreciated that the first impulse response reflects one or more acoustic paths from the speaker 10D to the microphone(s) 10E after outputting the first internal audio output signal 304A. In one or more example speakerphones, the speakerphone 10 is configured to adjust and/or compensate for the microphone(s) 10E and/or the speaker 10D. In other words, the speakerphone 10 is configured to adjust and/or compensate for one or more transfer functions of the microphone(s) 10E and/or the speaker 10D. The first impulse response may be associated with a first conference setup and/or first conference configuration. In other words, the first impulse response reflects a first conference setup and/or first conference configuration in a time interval between the first internal audio output signal 304A is outputted and the third microphone input signal is obtained at the plurality of microphones 10E.

The speakerphone 10 is configured to determine, using the processor 10C and based on the second internal output signal and the fourth microphone input signal, a second impulse response associated with the conference 300. The second impulse response may be seen as an acoustic impulse response. The second impulse response may be seen as an impulse response between the speaker 10D, e.g., being an excitation source, of the speakerphone 10 and the microphone(s) 10E of the speakerphone 10, such as the first microphone 10E_1 and/or the second microphone 10E_2. The second impulse response may be influenced by the speakerphone 10 itself and the conference 300, such as the environment of the conference 300, e.g., the room, where the speakerphone 10 is located. It may be appreciated that the second impulse response reflects one or more acoustic paths from the speaker 10D to the microphone(s) 10E after outputting the second internal output signal. The second impulse response may be associated with a second conference setup and/or second conference configuration. In other words, the second impulse response reflects a second conference setup and/or second conference configuration in a time interval between the second internal audio output signal 306A is outputted and the fourth microphone input signal is obtained at the plurality of microphones 10E. It may be appreciated that when one or more elements of the conference change, such as one or more elements of the conference configuration and/or conference setup change, the second impulse response may be different from the first impulse response.

The speakerphone 10 is configured to determine, such as using the processor 10C and based on the first plurality of beamforming parameters, the first impulse response, and the second impulse response, one or more conference parameters indicative of a conference configuration.

In one or more example speakerphones, to determine the one or more conference parameters comprises to determine a first difference between the first plurality of beamforming parameters and the second plurality of beamforming parameters. In other words, the speakerphone 10 is configured to determine a first difference between the first plurality of beamforming parameters and the second plurality of beamforming parameters. The first difference may be indicative of a difference in beamforming weights. The first difference may be indicative of a difference in beamforming lobes and/or beamforming beams, such as difference in the number, widths, and/or orientations of one or more beamforming lobes. The first difference may be indicative of a beamformer update. It may be appreciated that, to determine a first difference between the first plurality of beamforming parameters and the second plurality of beamforming parameters may comprise to monitor the weights of the beamformer. In FIG. 3, the first difference is indicative of a beamformer update from the first primary love 302A to the first secondary lobe 302B. In other words, the first plurality of beamforming parameters may be determined to increase the speech and/or voice of a first speaker 1A_1 speaking from a first position, while the second plurality of beamforming parameters may be determined to increase the speech and/or voice of a second speaker 1A_1 speaking from a second position.

In one or more example speakerphones, the speakerphone 10 is configured to, in accordance with a determination that the first difference satisfies a first criterion, set the first conference parameter to indicate a change 312 in audio source position in the conference 300, such as one or more audio sources. In other words, the speakerphone 10 is configured to, in accordance with a determination that the first difference satisfies a first criterion, set the first conference parameter to indicate a change 312 of a position of a speaker in the conference 300, such as a change in position of a participant in the conference. In FIG. 3, the first speaker and the second speaker are the same participant, namely the first participant 1A_1 having moved from the first position to the second position. In other words, the change of audio source position is caused by the first participant 1A_1 having moved 312 from the first position to the second position. However, this may not have been determined yet by the speakerphone. For example, to determine whether the first difference satisfies the first criterion may comprise to determine whether the first difference satisfies the position criterion. In other words, the first difference may satisfy the first criterion when a speaker, here the first participant 1A_1, in the conference 300 has moved from a first position to a second position before and/or at a beamformer update, and the second position is remote enough according to the first criterion. In other examples, the first difference may satisfy the first criterion when a turn-taking has taken place in the conference 300 before and/or at a beamformer update. For example, when two speakers that are remote enough according to the first criterion are taking turns at speaking. This could for example be the second participant 1A_2 taking turns at speaking with the third participant 1A_3. It may be appreciated that, the first difference may satisfy the first criterion when a change in audio source has happened between the obtaining of the first plurality of microphone input signals and the obtaining of the second plurality of microphone input signals.

When it is determined that the first difference satisfies the first criterion, the speakerphone 10 may be configured to determine that a change in audio source position has taken place, such as a change 312 in audio source position from the first position to the second position. The speakerphone 10 may be configured to update an audio source parameter associated with the conference 300. The first conference parameter may comprise the audio source parameter. In other words, the speakerphone 10 may be configured to update a conference configuration based on a determination of whether the first difference satisfies the first criterion. For example, to set the first conference parameter to indicate a change in audio source position in the conference 300 may comprise to update a conference configuration. For example, to set the first conference parameter to indicate a change in audio source position in the conference 300 may comprise to update a position of an audio source, such as an active audio source, in the conference 300.

It may be appreciated that, the beamformer is focusing on an active speaker in the conference 300 and thereby determines updated beamforming parameters when a change in audio source occurs in the conference. For example, the active speaker may change between the first participant 1A_1, the second participant 1A_2, and/or the third participant 1A_3. The updated beamforming parameters may be the second plurality of beamforming parameters after the first plurality of beamforming parameters. It may be appreciated that, to determine whether the first difference satisfies the first criterion may be seen as monitoring the weights of the beamformer. By monitoring the beamforming parameters, such as weights, of the beamformer, the speakerphone may be configured to extract information on the conference dynamics, such as turn-taking, number of participants, change in audio source, a speaker moving, and/or change in acoustics in the conference.

In one or more example speakerphones, to determine the one or more conference parameters comprises to determine a second difference between the first impulse response and the second impulse response.

In other words, the speakerphone 10 is configured to determine a second difference between the first impulse response and the second impulse response. It may be appreciated that, to determine a second difference between the first impulse response and the second impulse response may comprise to compare the first impulse response and the second impulse response. To determine a second difference between the first impulse response and the second impulse response may comprise to determine whether the first impulse response and the second impulse response are different. For example, the first impulse response may be indicative of a first conference configuration and/or first conference setup, while the second impulse response may be indicative of a second conference configuration and/or second conference setup. The second difference may be indicative of a difference between the acoustics in the conference 300 after outputting the first internal audio output signal and the acoustics in the conference 300 after outputting the second internal audio output signal. In other words, the second difference may be indicative of a difference between a first conference configuration and a second conference configuration.

In one or more example speakerphones, the speakerphone 10 is configured to, in accordance with the second difference satisfying a second criterion, set the first conference parameter to indicate a change in acoustics in the conference 300.

In other words, the speakerphone is configured to, in accordance with a determination that the second difference satisfies a second criterion, set the first conference parameter to indicate a change in acoustics in the conference 300, such as a change in conference configuration resulting in a change in acoustics in the conference. The second criterion may be seen as a criterion indicative of a change in impulse responses. The second criterion may comprise a second threshold. To determine whether the second difference satisfies the second criterion may comprise to determine whether the second difference is above or equal to the second threshold. The second threshold may for example indicate a threshold for the second difference above which the second difference is indicative of a change in acoustics in the conference 300. The second criterion may be seen as an impulse response criterion. The second criterion may be seen as an acoustics criterion. For example, to determine whether the second difference satisfies the second criterion may comprise to determine whether the second difference satisfies the acoustics criterion. In other words, the second difference may satisfy the second criterion when one or more elements in the conference have changed and/or moved so as to change the acoustics in the conference 300 enough according to the second criterion. For example, when a participant and/or an object in the conference 300 has moved from a first position to a second position the second impulse response may be different from the first impulse response. In other words, the second difference may satisfy the second criterion when a change in acoustics has taken place in the conference 300 between the determination of the first impulse response and the determination of the second impulse response, and that the change in acoustics is large enough according to the second criterion. It may be appreciated that, the second difference may satisfy the second criterion when a change in acoustics has happened between the obtaining of the third microphone input signal and the obtaining of the fourth microphone input signal. In FIG. 3, the second impulse response is different from the first impulse response because the first participant 1A_1 has moved from the first position to the second position. Since the second primary reverberation 306B is different from the first primary reverberation 304B, the second impulse response is also different from the first impulse response. When the first participant 1A_1 is changing position, the conference configuration and the acoustics are changing in the conference 300.

When it is determined that the second difference satisfies the second criterion, the speakerphone 10 may be configured to determine that a change in acoustics in the conference 300 has taken place, and to update an acoustics parameter associated with the conference 300. The first conference parameter may comprise the acoustics parameter. In other words, the speakerphone 10 may be configured to update a conference configuration based on a determination of whether the second difference satisfies the second criterion. For example, to set the first conference parameter to indicate a change in acoustics in the conference may comprise to update a conference configuration. For example, to set the first conference parameter to indicate a change in acoustics in the conference may comprise to update a position of one or more elements in the conference configuration and/or a content of elements in the conference. For example, to set the first conference parameter to indicate a change in acoustics in the conference may comprise to update the position of the first participant 1A_1.

It may be appreciated that, to determine whether the second difference satisfies the second criterion may be seen as monitoring the impulse response(s) in the conference. By monitoring the impulse response(s), the speakerphone may be configured to extract information on the conference dynamics, such as turn-taking, number of participants, change in audio source, a speaker moving, and/or change in acoustics in the conference.

In one or more example speakerphones, the speakerphone 10 is configured to, in accordance with a determination that the first difference satisfies the first criterion and in accordance with a determination that the second difference does not satisfy the second criterion, set, such as using the processor 10C, the first conference parameter to indicate a turn taking in the conference 300. In other words, when the impulse response in the conference is determined to be stable and the beamformer is changing beamforming parameters sufficiently, it may be determined that a turn taking is occurring in the conference, such as a turn taking in a conversation in the conference. In one or more example speakerphones, when it is determined that the first difference satisfies the first criterion and that the second difference does not satisfy the second criterion, the speakerphone 10 may be configured to determine that a turn taking has taken place in the conference 300, and to update a conference configuration parameter associated with the conference. It may be appreciated that, when the first criterion is satisfied and the second criterion is not satisfied, e.g., when these two conditions are fulfilled, a turn taking may be detected in the conference 300, such as a turn taking between two or more participants in the conference. A turn-taking may be seen as a change in the person speaking in the conference. For example, the participants in the conference may take turns at speaking. When the participants in the conference take turns at speaking the audio source position changes, since the positions of the participants in the conference may be different. Therefore, when the participants in the conference take turns at speaking, the beamforming parameters of a beamformer are changing in order to capture and/or increase the speech from the participant that is actively speaking. By tracking the impulse response and the change in beamforming parameters it may be possible to discriminate the change in audio source position from the turn taking in a conference. In other words, when the second difference does not satisfy the second criterion, the impulse response in the conference may be seen as stable. For example, when the second difference between the first impulse response and the second impulse response is smaller than the second threshold, the impulse response in the conference, such as room impulse response, may be seen as stable. For example, if the first participant 1A_1, the second participant 1B_2, and the third participant 1A_3 are sitting and/or standing still in the conference 300 but that the main speaker in the conference 300 is changing, such as the first participant 1A_1, the second participant 1B_2, and/or the third participant 1A_3 are switching at speaking, then the speakerphone 10 may determine that a turn-taking is occurring in the conference 300.

In one or more example speakerphones, the speakerphone 10 is configured to, in accordance with a determination that the first difference satisfies the first criterion and in accordance with a determination that the second difference does not satisfy the second criterion, set, such as using the processor 10C, the first conference parameter to indicate a turn taking in the conference 300 and to indicate a speaker being stationary in the conference 300. In other words, words, in accordance with a determination that the first difference satisfies the first criterion and in accordance with a determination that the second difference does not satisfy the second criterion it may be determined that a turn-taking is taking place and that there is substantially no change in acoustics in the conference 300. For example, if the first participant 1A_1, the second participant 1B_2, and the third participant 1A_3 are sitting and/or standing still in the conference 300 but that the main speaker in the conference 300 is changing, such as the first participant 1A_1, the second participant 1B_2, and/or the third participant 1A_3 are switching at speaking, then the speakerphone 10 may determine that a turn-taking is occurring in the conference 300 and that the speakers are being stationary in the conference 300.

In one or more example speakerphones, the speakerphone 10 is configured to determine a third plurality of beamforming parameters based on the first conference parameter, where the third plurality of beamforming parameters are associated with one or more participants of the conference. In other words, the speakerphone 10 is configured to, in accordance with the first conference parameter being indicative of a turn taking occurring in the conference 300 and indicative of a speaker being stationary in the conference 300, determine, such as using the processor 10C, a third plurality of beamforming parameters. To determine the third plurality of beamforming parameters may comprise to determine the third plurality of beamforming parameters based on the first conference parameter being indicative of a turn-taking and one or more speakers being stationary. In one or more example speakerphones, to determine the third plurality of beamforming parameters may comprise to determine the third plurality of beamforming parameters based on the first conference parameter being indicative of a turn-taking and one or more speakers being stationary, and the last determined beamforming parameters. Said differently, the third plurality of beamforming parameters may be set to be the last determined beamforming parameters, such as the first plurality of beamforming parameters and/or the second plurality of beamforming parameters. The third plurality of beamforming parameters may be associated with the stationary positions of the first participant 1A_1, the second participant 1B_2, and the third participant 1A_3 in the conference 300.

In one or more example speakerphones, the speakerphone 10 is configured to store the third plurality of beamforming parameters and use the third plurality of beamforming parameters as beamforming settings for the beamforming module. In other words, the speakerphone 10, such as the beamforming module, may be configured to use the third plurality of beamforming parameters as beamforming settings until one or more speakers in the conference 300 change position (such as until one or more speakers move). It is an advantage that the beamforming parameters associated with the one or more participants of the conference 300 may be stored and used as a starting point for future beamforming, since it obviates the need for determining (such as generating) new beamforming parameters for each participant at every update of the beamforming parameters. In other words, the third plurality of beamforming parameters may be used as beamforming settings for a next beamforming iteration.

In one or more example speakerphones, the speakerphone 10 is configured to, in accordance with a determination that the first difference satisfies the first criterion and in accordance with a determination that the second difference satisfies the second criterion, set, such as using the processor 10C, the first conference parameter to indicate a speaker moving in the conference 300.

In other words, when the impulse response in the conference is determined to be changing and the beamformer is changing beamforming parameters sufficiently, it may be determined that a speaker in the conference has moved, such as one or more speakers are moving in the conference 300. In one or more example speakerphones, when it is determined that the first difference satisfies the first criterion and that the second difference satisfies the second criterion, the speakerphone may be configured to determine that a speaker has moved in the conference, and to update a movement parameter associated with the conference. In FIG. 3, the speakerphone 10 has determined that the first participant 1A_1 (such as first speaker) has moved 312 from the first position to the second position while speaking and/or being the active speaker in the conference 300 based on the beamforming parameters having changed 310 and based on the impulse response having changed as well in the conference 300. To set the first conference parameter to indicate a speaker moving in the conference may comprise to update a movement parameter associated with the conference. The first conference parameter may therefore indicative that the first participant 1A_1 has moved from the first position to the second position. The movement parameter may comprise one or more positions, such as one or more positions with respect to the speakerphone, such as positions of the participants of the conference 300. It may be appreciated that, when the first criterion is satisfied and the second criterion is satisfied, e.g., when these two conditions are fulfilled, a speaker movement may be detected in the conference, such as a speaker moving from a first position to a second position in the conference, in FIG. 3 the first participant 1A_1. A speaker moving may be seen as a change in position of the person actively speaking in the conference. For example, the participants in the conference may walk around when speaking. When the active speaker, here the first participant 1A_1, is moving in the conference 300 when speaking the audio source position changes, since the position of the speaker in the conference 300 changes. Therefore, when the active speaker in the conference moves, the beamforming parameters of a beamformer are changing in order to capture and/or increase the speech from the speaker, and the acoustics in the conference 300 changes as well. By tracking the impulse response and the change in beamforming parameters it may be possible to discriminate a speaker moving from a turn taking in a conference. In other words, when the second difference satisfies the second criterion, the impulse response in the conference 300 may be seen as unstable or unsteady. For example, when the second difference between the first impulse response and the second impulse response is larger or equal to the second threshold, the impulse response in the conference, such as room impulse response, may be seen as changing.

In one or more example speakerphones, the conference configuration comprises one or more of: a number of participants in the conference 300, a position of a speaker in the conference 300, a size of an environment of the conference 300, turn taking information, and a level of absorption in the conference 300. In the example of FIG. 3, the conference configuration may be indicative of: a number of participants being three, the active speaker being participant 1A_1, the position of the speaker in the conference 300 having changed from a first position to a second position, a size of an environment of the conference 300 being approximately ten times fifteen meters, turn-taking is occurring between the participants, the second participant 1A_2 and the third participant 1A_3 being stationary, and a level of absorption in the conference associated with a sound absorption coefficient of $\alpha=0.4$, which indicates an acoustics characteristic of the conference (such as room characteristic) being soft, e.g., being less reverberant or echoic than normal (where normal may be $\alpha=0.25$). A conference associated with a sound absorption coefficient of a being less than or equal to 0.25 (such as less than or equal to 0.15) may be seen as a conference with reverberant or echoic acoustic characteristics. A conference associated with a sound absorption coefficient of a being equal to or more than 0.6 may be seen as a conference with hemi-anechoic acoustic characteristics. The level of absorption of the conference may alternatively or additionally be associated with a reverberation time, such as a reverberation time 60 (RT60). For example, the reverberation time 60 may preferably be less than 1 second, such as less than 0.8 second. In one or more example speakerphones words, the conference configuration may be indicative of one or more of: a number of participants in the conference, a position of a speaker in the conference, a size of an environment of the conference, turn taking information, and a level of absorption in the conference. In one or more example speakerphones, the conference configuration comprises one or more conference configuration parameters such as one or more of: a participant parameter, a position parameter, a size parameter, turn-taking parameter, a movement parameter, and an absorption parameter. In other words, the speakerphone 10 may be configured to update a conference configuration based on the first conference parameter. For example, the speakerphone 10 may be configured to update a conference configuration based on the conference dynamics indicated by the first conference parameter. In one or more example speakerphones, the speakerphone 10 may be configured to control the beamforming module based on the conference configuration.

The speakerphone 10 may be configured to perform any of the methods disclosed in FIGS. 4A-4E and FIGS. 5A-5B.

The processor 10C is optionally configured to perform any of the operations disclosed in FIG. 4A-4E (such as any one or more of S106, S108, S122A, S126A, S126B, S126C, S128, S130, S131, S132, S132A, S132B, S133, S134, S136, S138A, S138B, S140A, S140B, S142). The operations of the speakerphone 10 may be embodied in the form of executable logic routines (for example, lines of code, software programs, etc.) that are stored on a non-transitory computer readable medium (for example, memory 10A) and are executed by the processor 10C).

Furthermore, the operations of the speakerphone 10 may be considered a method that the speakerphone 10 is configured to carry out. Also, while the described functions and operations may be implemented in software, such functionality may as well be carried out via dedicated hardware or firmware, or some combination of hardware, firmware and/or software.

Memory 10A may be one or more of a buffer, a flash memory, a hard drive, a removable media, a volatile memory, a non-volatile memory, a random access memory (RAM), or other suitable device. In a typical arrangement, memory 10A may include a non-volatile memory for long term data storage and a volatile memory that functions as system memory for the processor 10C. The memory 10A may exchange data with the processor 10C over a data bus. Control lines and an address bus between the memory 10B and the processor 10C also may be present (not shown in FIG. 1). The memory 10A is considered a non-transitory computer readable medium.

The memory 10A may be configured to store information such as impulse response(s), conference parameter(s), beamforming parameter(s), conference configuration(s), and/or machine learning model(s) as disclosed herein in a part of the memory.

The system 2 may be configured to perform any of the methods disclosed in FIGS. 4A-4E and FIGS. 5A-5B.

Furthermore, the operations of the system 2 may be considered a method that the system 2 is configured to carry out. Also, while the described functions and operations may be implemented in software, such functionality may as well be carried out via dedicated hardware or firmware, or some combination of hardware, firmware and/or software.

FIGS. 4A-4E show a flow diagram of an example method, such as a method 100. A method 100 of operating a speakerphone is disclosed, such as a speakerphone as disclosed herein (e.g., the speakerphone 10 of FIG. 1, FIG. 2, and/or FIG. 3). The method 100 comprises obtaining S102, using the speakerphone, a first plurality of microphone input signals of a conference. The method 100 comprises determining S104, using the speakerphone and based on the first plurality of microphone input signals, a first plurality of beamforming parameters. The method 100 comprises obtaining S110, using the speakerphone, a first internal output signal for provision of a first internal audio output signal in the conference. The method 100 comprises outputting S112, using the speakerphone and based on the first internal output signal, the first internal audio output signal in the conference. The method 100 comprises obtaining S114, using the speakerphone, a third microphone input signal associated with the first internal audio output signal. The method 100 comprises obtaining S116, using the speakerphone, a second internal output signal for provision of a second internal audio output signal in the conference. The method 100 comprises outputting S118, using the speakerphone and based on the second internal output signal, the second internal audio output signal in the conference. The method 100 comprises obtaining S120, using the speakerphone, a fourth microphone input signal associated with the second internal audio output signal. The method 100 comprises determining S122, using the speakerphone and based on the first internal output signal and the third microphone input signal, a first impulse response associated with the conference. The method 100 comprises determining S124, using the speakerphone and based on the second internal output signal and the fourth microphone input signal, a second impulse response associated with the conference. The method 100 comprises determining S126, using the speakerphone and based on the first plurality of beamforming parameters, the first impulse response, and the second impulse response, one or more conference parameters indicative of a conference configuration, the one or more conference parameters including a first conference parameter. The method 100 comprises outputting S150 the first conference parameter.

In one or more example methods, the speakerphone comprises a beamforming module configured to operate according to beamforming settings. In one or more example methods, the method 100 comprises controlling S128, based on the first conference parameter, the beamforming module.

In one or more example methods, the method 100 comprises obtaining S106, using the speakerphone, a second plurality of microphone input signals of the conference. In one or more example methods, the method 100 comprises determining S108, based on the second plurality of microphone input signals, a second plurality of beamforming parameters. In one or more example methods, determining S126 the one or more conference parameters is based on the second plurality of beamforming parameters.

In one or more example methods, the first plurality of microphone input signals are obtained at a first time and the second plurality of microphone input signals are obtained at a second time. In one or more example methods, the second time is after the first time.

In one or more example methods, the third microphone input signal is obtained at a third time and the fourth microphone input signal is obtained at a fourth time. In one or more example methods, the fourth time is after the third time.

In one or more example methods, determining S126 the one or more conference parameters comprises determining S126A a first difference between the first plurality of beamforming parameters and the second plurality of beamforming parameters.

In one or more example methods, the method 100 comprises determining S130 whether the first difference satisfies a first criterion.

In one or more example methods, the method 100 comprises, in accordance with a determination that the first difference satisfies a first criterion, setting S134 the first conference parameter to indicate a change in audio source position in the conference. In one or more example methods, the method 100 comprises, in accordance with a determination that the first difference does not satisfy a first criterion, setting S131 the first conference parameter to indicate no change in audio source position in the conference. In other words, setting S131 the first conference parameter to indicate no change in audio source position in the conference may be seen as setting the first conference parameter to indicate that the audio source position is stationary.

In one or more example methods, determining S126 the one or more conference parameters comprises determining S126B a second difference between the first impulse response and the second impulse response.

In one or more example methods, the method 100 comprises determining S132 whether the second difference satisfies a second criterion.

In one or more example methods, the method 100 comprises, in accordance with the second difference satisfying the second criterion, setting S136 the first conference parameter to indicate a change in acoustics in the conference. In one or more example methods, the method 100 comprises, in accordance with the second difference not satisfying the second criterion, setting S133 the first conference parameter to indicate no change in acoustics in the conference. In other words, setting S133 the first conference parameter to indicate no change in acoustics in the conference may be seen as setting the first conference parameter to indicate that the impulse response is stable.

In one or more example methods, the method 100 comprises, in accordance with a determination that the first difference satisfies the first criterion and in accordance with a determination that the second difference does not satisfy the second criterion, setting S140A the first conference parameter to indicate a turn taking in the conference. In one or more example methods, the method 100 comprises, in accordance with a determination that the first difference does not satisfy the first criterion and in accordance with a determination that the second difference satisfies the second criterion, setting S138B the first conference parameter to indicate a participant, such as a non-speaking participant, moving in the conference.

In one or more example methods, the method 100 comprises, in accordance with a determination that the first difference satisfies the first criterion and in accordance with a determination that the second difference does not satisfy the second criterion, setting S142 the first conference parameter to indicate a turn taking in the conference and to indicate a speaker being stationary in the conference. In one or more example methods, the method 100 comprises, in accordance with a determination that the first difference satisfies the first criterion and in accordance with a determination that the second difference does not satisfy the second criterion, determining S144 a third plurality of beamforming parameters based on the first conference parameter. In one or more example methods, the third plurality of beamforming parameters is associated with one or more participants of the conference. In one or more example methods, the method 100 comprises, in accordance with a determination that the first difference does not satisfy the first criterion and in accordance with a determination that the second difference does not satisfy the second criterion, setting S140B the first conference parameter to indicate no change in audio source position, such as no turn-taking, in the conference and to indicate no change in acoustics in the conference. In other words, the method 100 may comprise setting the first conference parameter to indicate that the audio source position is stationary and/or setting the first conference parameter to indicate that the impulse response is stable. For example, the method 100 comprises, in accordance with a determination that the first difference does not satisfy the first criterion and in accordance with a determination that the second difference does not satisfy the second criterion, setting the first conference parameter to indicate that the same speaker is still the active speaker and that the participants in the conference are stationary.

In one or more example methods, the method 100 comprises storing S146 the third plurality of beamforming parameters. In one or more example methods, the method 100 comprises using S148 the third plurality of beamforming parameters as beamforming settings for the beamforming module.

In one or more example methods, the method 100 comprises, in accordance with a determination that the first difference satisfies the first criterion and in accordance with a determination that the second difference satisfies the second criterion, setting S138A the first conference parameter to indicate a speaker moving in the conference.

In one or more example methods, determining S122 an impulse response comprises reducing S122A one or more echo components from a microphone input signal.

In one or more example methods, the conference configuration comprises one or more of: a number of participants in the conference, a position of a speaker in the conference, a size of an environment of the conference, turn taking information, and a level of absorption in the conference.

In one or more example methods, determining S126 the one or more conference parameters comprises determining S126C the one or more conference parameters, based on the first plurality of beamforming parameters, the first impulse response, and the second impulse response and using a machine learning model.

Figure 5A:
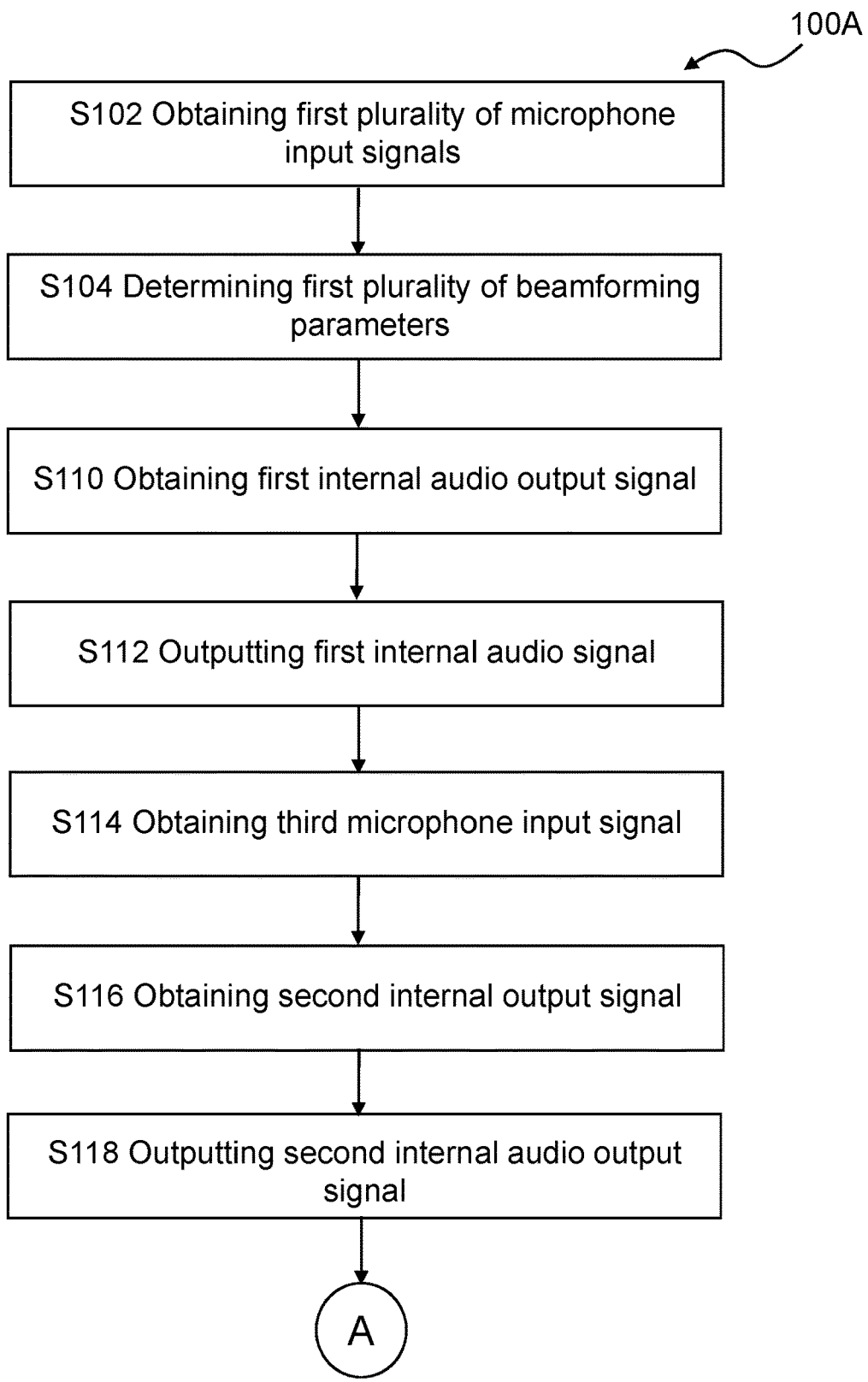
FIGS. 5A-5B is a flow chart of an example method according to the present disclosure.
Figure 5B:
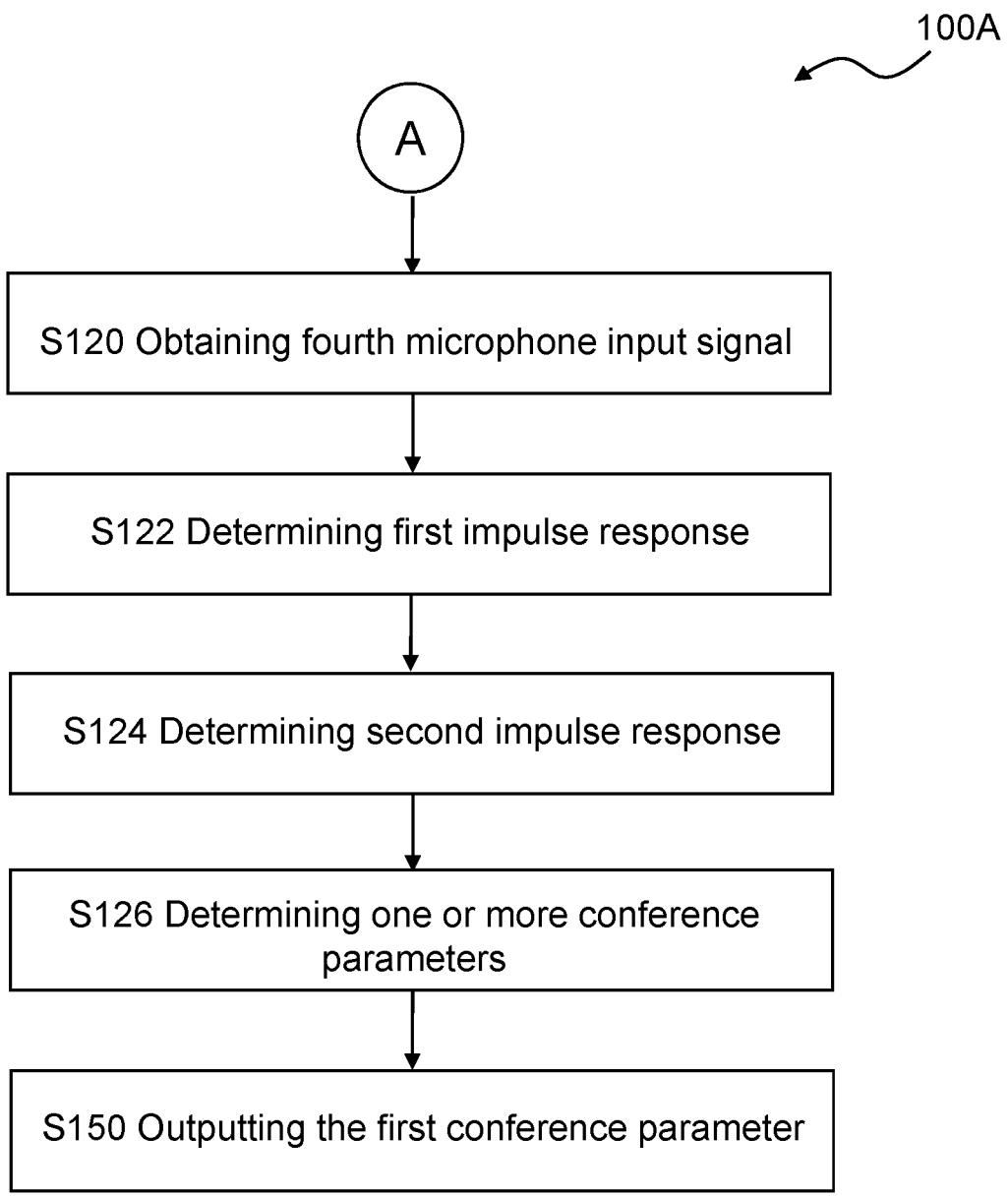

FIGS. 5A-5B show a flow diagram of an example method, such as a method 100A. A method 100A of operating a speakerphone is disclosed, such as a speakerphone as disclosed herein (e.g., the speakerphone 10 of FIG. 1, FIG. 2, and/or FIG. 3).

The method comprises obtaining S102, using the speakerphone, a first plurality of microphone input signals of a conference. The method 100A comprises determining S104, using the speakerphone and based on the first plurality of microphone input signals, a first plurality of beamforming parameters. The method 100A comprises obtaining S110, using the speakerphone, a first internal output signal for provision of a first internal audio output signal in the conference. The method 100A comprises outputting S112, using the speakerphone and based on the first internal output signal, the first internal audio output signal in the conference. The method 100A comprises obtaining S114, using the speakerphone, a third microphone input signal associated with the first internal audio output signal. The method 100A comprises obtaining S116, using the speakerphone, a second internal output signal for provision of a second internal audio output signal in the conference. The method 100A comprises outputting S118, using the speakerphone and based on the second internal output signal, the second internal audio output signal in the conference. The method 100A comprises obtaining S120, using the speakerphone, a fourth microphone input signal associated with the second internal audio output signal. The method 100A comprises determining S122, using the speakerphone and based on the first internal output signal and the third microphone input signal, a first impulse response associated with the conference. The method 100A comprises determining S124, using the speakerphone and based on the second internal output signal and the fourth microphone input signal, a second impulse response associated with the conference. The method 100A comprises determining S126, using the speakerphone and based on the first plurality of beamforming parameters, the first impulse response, and the second impulse response, one or more conference parameters indicative of a conference configuration, the one or more conference parameters including a first conference parameter. The method 100A comprises outputting S150 the first conference parameter.

Examples of speakerphones, systems, and methods according to the disclosure are set out in the following items:

Item 1. A speakerphone, the speakerphone comprising an interface, a speaker, and a plurality of microphones, the speakerphone comprising a processor and a memory, wherein the speakerphone is configured to:
  obtain, using the plurality of microphones, a first plurality of microphone input signals of a conference;
  determine, using the processor and based on the first plurality of microphone input signals, a first plurality of beamforming parameters;
  obtain, using the processor, a first internal output signal for provision of a first internal audio output signal in the conference;
  output, using the speaker and based on the first internal output signal, the first internal audio output signal in the conference;
  obtain, using the plurality of microphones, a third microphone input signal associated with the first internal audio output signal;
  obtain, using the processor, a second internal output signal for provision of a second internal audio output signal in the conference;
  output, using the speaker and based on the second internal output signal, the second internal audio output signal in the conference;
  obtain, using the plurality of microphones, a fourth microphone input signal associated with the second internal audio output signal;
  determine, using the processor and based on the first internal output signal and the third microphone input signal, a first impulse response associated with the conference;
  determine, using the processor and based on the second internal output signal and the fourth microphone input signal, a second impulse response associated with the conference;
  determine, using the processor and based on the first plurality of beamforming parameters, the first impulse response, and the second impulse response, one or more conference parameters indicative of a conference configuration, the one or more conference parameters including a first conference parameter; and
  output the first conference parameter.

Item 2. Speakerphone according to item 1, wherein the processor comprises a beamforming module configured to operate according to beamforming settings, and wherein the speakerphone is configured to control, based on the first conference parameter, the beamforming module.

Item 3. Speakerphone according to any of the previous items wherein the speakerphone is configured to:
  obtain, using the plurality of microphones, a second plurality of microphone input signals of the conference;
  determine, using the processor and based on the second plurality of microphone input signals, a second plurality of beamforming parameters; and wherein to determine the one or more conference parameters is based on the second plurality of beamforming parameters.

Item 4. Speakerphone according to item 3, wherein the first plurality of microphone input signals are obtained at a first time and the second plurality of microphone input signals are obtained at a second time, and wherein the second time is after the first time.

Item 5. Speakerphone according to any of the previous items, wherein the third microphone input signal is obtained at a third time and the fourth microphone input signal is obtained at a fourth time, and wherein the fourth time is after the third time.

Item 6. Speakerphone according to any of items 3 to 5, wherein to determine the one or more conference parameters comprises to determine a first difference between the first plurality of beamforming parameters and the second plurality of beamforming parameters.

Item 7. Speakerphone according to item 6, wherein the speakerphone is configured to, in accordance with a determination that the first difference satisfies a first criterion, set the first conference parameter to indicate a change in audio source position in the conference.

Item 8. Speakerphone according to any of the previous items, wherein to determine the one or more conference parameters comprises to determine a second difference between the first impulse response and the second impulse response, and wherein the speakerphone is configured to, in accordance with a determination that the second difference satisfies a second criterion, set the first conference parameter to indicate a change in acoustics in the conference.

Item 9. Speakerphone according to item 6 or 7 and item 8, wherein the speakerphone is configured to, in accordance with a determination that the first difference satisfies the first criterion and in accordance with a determination that the second difference does not satisfy the second criterion, set the first conference parameter to indicate a turn taking in the conference.

Item 10. Speakerphone according to item 9, wherein the speakerphone is configured to, in accordance with a determination that the first difference satisfies the first criterion and in accordance with a determination that the second difference does not satisfy the second criterion, set the first conference parameter to indicate a turn taking in the conference and to indicate a speaker being stationary in the conference, and determine a third plurality of beamforming parameters based on the first conference parameter, the third plurality of beamforming parameters being associated with one or more participants of the conference.

Item 11. Speakerphone according to item 2 and 10, wherein the speakerphone is configured to store the third plurality of beamforming parameters and use the third plurality of beamforming parameters as beamforming settings for the beamforming module.

Item 12. Speakerphone according to item 6 or 7 and item 8, wherein the speakerphone is configured to, in accordance with a determination that the first difference satisfies the first criterion and in accordance with a determination that the second difference satisfies the second criterion, set the first conference parameter to indicate a speaker moving in the conference.

Item 13. Speakerphone according to any of the previous items, wherein the processor comprises an echo canceller; and wherein to determine an impulse response comprises to reduce, using the echo canceller, one or more echo components from a microphone input signal.

Item 14. Speakerphone according to item 13, wherein the speakerphone is configured to control, based on the first conference parameter, the echo canceller.

Item 15. Speakerphone according to any of the previous items, wherein the conference configuration comprises one or more of: a number of participants in the conference, a position of a speaker in the conference, a size of an environment of the conference, turn taking information, and a level of absorption in the conference.

Item 16. Speakerphone according to any of the previous items, wherein the processor comprises machine learning circuitry configured to operate according to a machine learning model, wherein to determine the one or more conference parameters comprises to determine the one or more conference parameters, based on the first plurality of beamforming parameters, the first impulse response, and the second impulse response, using the machine learning model.

Item 17. A system comprising a speakerphone according to any of items 1 to 16 and a server device.

Item 18. A method of operating a speakerphone, wherein the method comprises:
  obtaining (S102), using the speakerphone, a first plurality of microphone input signals of a conference;
  determining (S104), using the speakerphone and based on the first plurality of microphone input signals, a first plurality of beamforming parameters;
  obtaining (S110), using the speakerphone, a first internal output signal for provision of a first internal audio output signal in the conference;
  outputting (S112), using the speakerphone and based on the first internal output signal, the first internal audio output signal in the conference;
  obtaining (S114), using the speakerphone, a third microphone input signal associated with the first internal audio output signal;
  obtaining (S116), using the speakerphone, a second internal output signal for provision of a second internal audio output signal in the conference;
  outputting (S118), using the speakerphone and based on the second internal output signal, the second internal audio output signal in the conference;
  obtaining (S120), using the speakerphone, a fourth microphone input signal associated with the second internal audio output signal;
  determining (S122), using the speakerphone and based on the first internal output signal and the third microphone input signal, a first impulse response associated with the conference;
  determining (S124), using the speakerphone and based on the second internal output signal and the fourth microphone input signal, a second impulse response associated with the conference;
  determining (S126), using the speakerphone and based on the first plurality of beamforming parameters, the first impulse response, and the second impulse response, one or more conference parameters indicative of a conference configuration, the one or more conference parameters including a first conference parameter; and
  outputting (S150) the first conference parameter.

Item 19. The method according to item 18, wherein the speakerphone comprises a beamforming module configured to operate according to beamforming settings, and wherein the method comprises:
  controlling (S128), based on the first conference parameter, the beamforming module.

Item 20. The method according to any of items 18-19, wherein the method comprises:
  obtaining (S106), using the speakerphone, a second plurality of microphone input signals of the conference;
  determining (S108), based on the second plurality of microphone input signals, a second plurality of beamforming parameters;
  and wherein determining (S126) the one or more conference parameters is based on the second plurality of beamforming parameters.

Item 21. The method according to item 20, wherein the first plurality of microphone input signals are obtained at a first time and the second plurality of microphone input signals are obtained at a second time, and wherein the second time is after the first time.

Item 22. The method according to any of items 18-21, wherein the third microphone input signal is obtained at a third time and the fourth microphone input signal is obtained at a fourth time, and wherein the fourth time is after the third time.

Item 23. The method according to any of items 20-22, wherein determining (S126) the one or more conference parameters comprises:
  determining (S126A) a first difference between the first plurality of beamforming parameters and the second plurality of beamforming parameters.

Item 24. The method according to item 23, wherein the method comprises, in accordance with a determination that the first difference satisfies a first criterion;
  setting (S134) the first conference parameter to indicate a change in audio source position in the conference.

Item 25. The method according to any of items 18-23, wherein determining (S126) the one or more conference parameters comprises;
  determining (S126B) a second difference between the first impulse response and the second impulse response; and wherein
  the method comprises, in accordance with a determination that the second difference satisfies a second criterion;
  setting (S136) the first conference parameter to indicate a change in acoustics in the conference.

Item 26. The method according to item 23 or 24 and item 25, wherein the method comprises, in accordance with a determination that the first difference satisfies the first criterion and in accordance with a determination that the second difference does not satisfy the second criterion;
  setting (S140A) the first conference parameter to indicate a turn taking in the conference.

Item 27. The method according to item 26, wherein the method comprises, in accordance with a determination that the first difference satisfies the first criterion and in accordance with a determination that the second difference does not satisfy the second criterion;
  setting (S142) the first conference parameter to indicate a turn taking in the conference and to indicate a speaker being stationary in the conference; and
  determining (S144) a third plurality of beamforming parameters based on the first conference parameter, the third plurality of beamforming parameters being associated with one or more participants of the conference.

Item 28. The method according to item 19 and 27, wherein the method comprises;
  storing (S146) the third plurality of beamforming parameters;
  using (S148) the third plurality of beamforming parameters as beamforming settings for the beamforming module.

Item 29. The method according to item 23 or 24 and item 25, wherein the method comprises, in accordance with a determination that the first difference satisfies the first criterion and in accordance with a determination that the second difference satisfies the second criterion;
  setting (S138A) the first conference parameter to indicate a speaker moving in the conference.

Item 30. The method according to any of items 18-29, wherein determining (S122) an impulse response comprises;
  reducing (S122A) one or more echo components from a microphone input signal.

Item 31. The method according to any of items 18-30, wherein the conference configuration comprises one or more of: a number of participants in the conference, a position of a speaker in the conference, a size of an environment of the conference, turn taking information, and a level of absorption in the conference.

Item 32. The method according to any of items 18-31, wherein determining (S126) the one or more conference parameters comprises;
  determining (S126C) the one or more conference parameters, based on the first plurality of beamforming parameters, the first impulse response, and the second impulse response.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed.

The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES 1A user(s), near-end
1B user(s), speaker(s), far-end
2 speakerphone system
4 user input, obtain
6 output
10 speakerphone
10A memory
10B one or more interfaces
10C processor
10D one or more speakers
10E plurality of microphones
10E_1 first plurality of microphones
10E_2 second plurality of microphones
10E_3 third plurality of microphones
10E_4 fourth plurality of microphones
13 transmit
14 obtain
16 obtain, receive
18 transmit
20 server device
20A memory
20B one or more interfaces
20C one or more processors
21 machine learning circuitry
22 transmit
24 obtain, receive
30 communication device 36 output
38 obtain
40 network
50 microphone input signal
50A first plurality of microphone input signals
50B second plurality of microphone input signals
50C third plurality of microphone input signals
50D fourth plurality of microphone input signals
51 far-end signal
52 internal output signal
52A first internal output signal
52B second internal output signal
53 external output signal
54 impulse response
54A first impulse response
54B second impulse response
55 internal audio output signal
55A first internal audio output signal
55B second internal audio output signal
56 first environment parameter
60 electronic device
61 output
62 conference parameter(s)
64 output
66 conference parameter(s)
66A first conference parameter
70 echo canceller
70A impulse response determiner
72 feature extractor
74 machine learning circuitry
76 conference parameter determiner
78 far-end processor
300 conference
302A first primary lobe
302B first secondary lobe
302C second lobe
302D third lobe
304A first internal audio output signal
304B first primary reverberation
304C first secondary reverberation
306A second internal audio output signal
306B second primary reverberation
306C second secondary reverberation
310 change in beamforming parameters
312 movement of first speaker
1A_1 first participant
1A_2 second participant
1A_3 third participant
1A_4 fourth participant
DP direct path
100 Method of operating a speakerphone
S102 Obtaining first plurality of microphone input signals
S104 Determining first plurality of beamforming signals
S110 Obtaining first internal audio output signal
S112 Outputting first internal audio signal
S114 Obtaining third microphone input signal
S116 Obtaining second internal output signal
S118 Outputting second internal audio output signal
S120 Obtaining fourth microphone input signal
S122 Determining first impulse response
S124 Determining second impulse response
S126 Determining one or more conference parameters
S150 Outputting the first conference parameter

The invention claimed is:

1. A speakerphone, the speakerphone comprising an interface, a speaker, and a plurality of microphones, the speakerphone comprising a processor and a memory, wherein the speakerphone is configured to:
   obtain, using the plurality of microphones, a first plurality of microphone input signals of a conference;
   determine, using the processor and based on the first plurality of microphone input signals, a first plurality of beamforming parameters;
   obtain, using the processor, a first internal output signal for provision of a first internal audio output signal in the conference;
   output, using the speaker and based on the first internal output signal, the first internal audio output signal in the conference;
   obtain, using the plurality of microphones, a third microphone input signal associated with the first internal audio output signal;
   obtain, using the processor, a second internal output signal for provision of a second internal audio output signal in the conference;
   output, using the speaker and based on the second internal output signal, the second internal audio output signal in the conference;
   obtain, using the plurality of microphones, a fourth microphone input signal associated with the second internal audio output signal;
   determine, using the processor and based on the first internal output signal and the third microphone input signal, a first impulse response associated with the conference;
   determine, using the processor and based on the second internal output signal and the fourth microphone input signal, a second impulse response associated with the conference; and
   determine, using the processor and based on the first plurality of beamforming parameters, the first impulse response, and the second impulse response, one or more conference parameters indicative of a conference configuration, the one or more conference parameters including a first conference parameter; and
   output the first conference parameter, and
where the processor comprises a beamforming module configured to operate according to beamforming settings, and wherein the speakerphone is configured to control, based on the first conference parameter, the beamforming module.

2. Speakerphone according to claim 1, wherein the first plurality of microphone input signals are obtained at a first time and the second plurality of microphone input signals are obtained at a second time, and wherein the second time is after the first time.

3. Speakerphone according to claim 1 wherein the speakerphone is configured to:
   obtain, using the plurality of microphones, a second plurality of microphone input signals of the conference;
   determine, using the processor and based on the second plurality of microphone input signals, a second plurality of beamforming parameters; and wherein to determine the one or more conference parameters is based on the second plurality of beamforming parameters.

4. Speakerphone according to claim 3, wherein the first plurality of microphone input signals are obtained at a first time and the second plurality of microphone input signals are obtained at a second time, and wherein the second time is after the first time.

5. Speakerphone according to claim 1, wherein the third microphone input signal is obtained at a third time and the fourth microphone input signal is obtained at a fourth time, and wherein the fourth time is after the third time.

6. Speakerphone according to claim 1, wherein to determine the one or more conference parameters comprises to determine a first difference between the first plurality of beamforming parameters and the second plurality of beamforming parameters.

7. Speakerphone according to claim 6, wherein the speakerphone is configured to, in accordance with a determination that the first difference satisfies a first criterion, set the first conference parameter to indicate a change in audio source position in the conference.

8. Speakerphone according claim 1, wherein to determine the one or more conference parameters comprises to determine a second difference between the first impulse response and the second impulse response, and wherein the speakerphone is configured to, in accordance with the second difference satisfying a second criterion, set the first conference parameter to indicate a change in acoustics in the conference.

9. Speakerphone according to claim 6, wherein the speakerphone is configured to, in accordance with a determination that the first difference satisfies the first criterion and in accordance with a determination that the second difference does not satisfy the second criterion, set the first conference parameter to indicate a turn taking in the conference.

10. Speakerphone according to claim 9, wherein the speakerphone is configured to, in accordance with a determination that the first difference satisfies the first criterion and in accordance with a determination that the second difference does not satisfy the second criterion, set the first conference parameter to indicate a turn taking in the conference and to indicate a speaker being stationary in the conference, and determine a third plurality of beamforming parameters based on the first conference parameter, the third plurality of beamforming parameters being associated with one or more participants of the conference.

11. Speakerphone according to claim 2, wherein the speakerphone is configured to store the third plurality of beamforming parameters and use the third plurality of beamforming parameters as beamforming settings for the beamforming module.

12. Speakerphone according to claim 6, wherein the speakerphone is configured to, in accordance with a determination that the first difference satisfies the first criterion and in accordance with a determination that the second difference satisfies the second criterion, set the first conference parameter to indicate a speaker moving in the conference.

13. Speakerphone according to claim 1, wherein the conference configuration comprises one or more of: a number of participants in the conference, a position of a speaker in the conference, a size of an environment of the conference, turn-taking information, and a level of absorption in the conference.

14. A system comprising a speakerphone according to claim 1 and a server device.

15. A method of operating a speakerphone, wherein the method comprises:
obtaining, using the speakerphone, a first plurality of microphone input signals of a conference;
determining, using the speakerphone and based on the first plurality of microphone input signals, a first plurality of beamforming parameters;
obtaining, using the speakerphone, a first internal output signal for provision of a first internal audio output signal in the conference;
outputting, using the speakerphone and based on the first internal output signal, the first internal audio output signal in the conference;
obtaining using the speakerphone, a third microphone input signal associated with the first internal audio output signal;
obtaining, using the speakerphone, a second internal output signal for provision of a second internal audio output signal in the conference;
outputting, using the speakerphone and based on the second internal output signal, the second internal audio output signal in the conference;
obtaining, using the speakerphone, a fourth microphone input signal associated with the second internal audio output signal;
determining, using the speakerphone and based on the first internal output signal and the third microphone input signal, a first impulse response associated with the conference;
determining, using the speakerphone and based on the second internal output signal and the fourth microphone input signal, a second impulse response associated with the conference;
determining, using the speakerphone and based on the first plurality of beamforming parameters, the first impulse response, and the second impulse response, one or more conference parameters indicative of a conference configuration, the one or more conference parameters including a first conference parameter; and
outputting the first conference parameter.

* * * * *